(12) United States Patent
Fujishiro et al.

(10) Patent No.: US 9,616,332 B2
(45) Date of Patent: Apr. 11, 2017

(54) GAME CONTROL DEVICE, SYSTEM, AND METHOD OF CAUSING A USER CHARACTER TO PERFORM A DESIRED MOTION AMONG A PLURALITY OF KINDS OF MOTION

(71) Applicant: KONAMI DIGITAL ENTERTAINMENT CO., LTD., Tokyo (JP)

(72) Inventors: Yuji Fujishiro, Tokyo (JP); Ippei Kondo, Tokyo (JP); Tatsuya Ishida, Tokyo (JP); Masaki Nakamura, Tokyo (JP); Kei Masuda, Tokyo (JP)

(73) Assignee: KONAMI DIGITAL ENTERTAINMENT CO., LTD., Tokyo (JP)

( * ) Notice: Subject to any disclaimer, the term of this patent is extended or adjusted under 35 U.S.C. 154(b) by 394 days.

(21) Appl. No.: 14/295,348

(22) Filed: Jun. 4, 2014

(65) Prior Publication Data
US 2014/0364233 A1 Dec. 11, 2014

(30) Foreign Application Priority Data

Jun. 7, 2013 (JP) ................................. 2013-121313
Jun. 7, 2013 (JP) ................................. 2013-121318

(51) Int. Cl.
*A63F 9/24* (2006.01)
*A63F 13/211* (2014.01)
(Continued)

(52) U.S. Cl.
CPC ............ *A63F 13/211* (2014.09); *A63F 13/42* (2014.09); *A63F 13/812* (2014.09);
(Continued)

(58) Field of Classification Search
None
See application file for complete search history.

(56) References Cited

U.S. PATENT DOCUMENTS 6,149,520 A * 11/2000 Takatsuka ............... A63F 13/10 273/108.1
6,196,917 B1 * 3/2001 Mathias .................. A63F 13/10 463/2
(Continued)

FOREIGN PATENT DOCUMENTS

JP H10-113471 A 5/1998
JP 2001-087543 A 4/2001
(Continued)

OTHER PUBLICATIONS

The partial translation of OA for corresponding Patent Application No. JP2013-121313 dated Mar. 17, 2015.
(Continued)

*Primary Examiner* — Jason Yen
(74) *Attorney, Agent, or Firm* — Hubbs, Enatsky & Inoue PLLC

(57) ABSTRACT

A game control device includes a direction obtaining unit, a motion data selection unit, and a user character control unit. In a case where a direction designating operation is performed by a user, the direction obtaining unit obtains a relative direction of the direction designated through the direction designating operation relative to the forward direction of a user character. The motion data selection unit selects any of motion data correlated to a type to which the relative direction obtained by the direction obtaining unit belongs from among the motion data stored in a unit that stores a type of a relative direction relative to the forward direction of the user character and a plurality of kinds of motion data so as to be correlated to each other. The user
(Continued)

character control unit causes the user character to perform a motion in accordance with the selected motion data.

20 Claims, 15 Drawing Sheets

(51) Int. Cl.
    *A63F 13/42*     (2014.01)
    *A63F 13/812*     (2014.01)
(52) U.S. Cl.
    CPC ............. *A63F 2300/6045* (2013.01); *A63F 2300/6054* (2013.01); *A63F 2300/63* (2013.01); *A63F 2300/64* (2013.01); *A63F 2300/6607* (2013.01); *A63F 2300/6684* (2013.01)

(56) References Cited

U.S. PATENT DOCUMENTS

| | | | |
|---|---|---|---|
| 6,280,323 B1 * | 8/2001 | Yamazaki | A63F 13/005 |
| | | | 463/31 |
| 6,614,435 B1 | 9/2003 | Tsujimoto | |
| 2004/0219978 A1 * | 11/2004 | Teramoto | A63F 13/10 |
| | | | 463/32 |
| 2005/0159217 A1 * | 7/2005 | Tawara | A63F 13/10 |
| | | | 463/31 |
| 2007/0139419 A1 * | 6/2007 | Azuma | A63F 13/10 |
| | | | 345/474 |
| 2008/0207324 A1 * | 8/2008 | Hiroshige | A63F 13/10 |
| | | | 463/33 |
| 2012/0169592 A1 | 7/2012 | Kondo | |

FOREIGN PATENT DOCUMENTS

| | | | | |
|---|---|---|---|---|
| JP | 2001-353360 A | 12/2001 | | |
| JP | 2005-204757 A | 8/2005 | | |
| JP | 2007-160006 A | 6/2007 | | |
| JP | 2007160006 | * | 6/2007 | ............ A63F 13/00 |
| JP | 2011-065425 A | 3/2011 | | |

OTHER PUBLICATIONS

The partial translation of OA for corresponding Patent Application No. JP2013-121318 dated Feb. 24, 2015.

* cited by examiner

| MOTION | OPERATION |
|---|---|
| MOVEMENT (DRIBBLE) | LEFT STICK |
| FEINT | RIGHT STICK |
| SHORT PASS | × |
| LONG PASS | ○ |
| SHOOT | □ |
| PRESS | × |
| TACKLE | ○ |

| DIRECTION | FEINT MOTION DATA |
|---|---|
| FORWARD DIRECTION | FEINT MOTION DATA F1 |
| | FEINT MOTION DATA F2 |
| | ... |
| REARWARD DIRECTION | FEINT MOTION DATA B1 |
| | FEINT MOTION DATA B2 |
| | ... |
| LEFTWARD DIRECTION | FEINT MOTION DATA L1 |
| | FEINT MOTION DATA L2 |
| | ... |
| RIGHTWARD DIRECTION | FEINT MOTION DATA R1 |
| | FEINT MOTION DATA R2 |
| | ... |

FIG.11

| ID | NAME | POSITION | ORIENTATION | MOVEMENT SPEED | MOTION DATA | REPRODUCTION POSITION | BALL HOLDING FLAG | OPERATION TARGET FLAG | ... | ABILITY PARAMETER | STATE PARAMETER | ... |
|---|---|---|---|---|---|---|---|---|---|---|---|---|
| C101 | --- | --- | --- | --- | --- | --- | 0 | 0 | ... | --- | --- | ... |
| C102 | --- | --- | --- | --- | --- | --- | 0 | 0 | ... | --- | --- | ... |
| C103 | --- | --- | --- | --- | --- | --- | 0 | 0 | ... | --- | --- | ... |
| ... | ... | ... | ... | ... | ... | ... | ... | ... | ... | ... | ... | ... |
| C111 | --- | --- | --- | --- | --- | --- | 1 | 1 | ... | --- | --- | ... |
| C201 | --- | --- | --- | --- | --- | --- | 0 | --- | ... | --- | --- | ... |
| ... | ... | ... | ... | ... | ... | ... | ... | ... | ... | ... | ... | ... |
| C211 | --- | --- | --- | --- | --- | --- | 0 | --- | ... | --- | --- | ... |

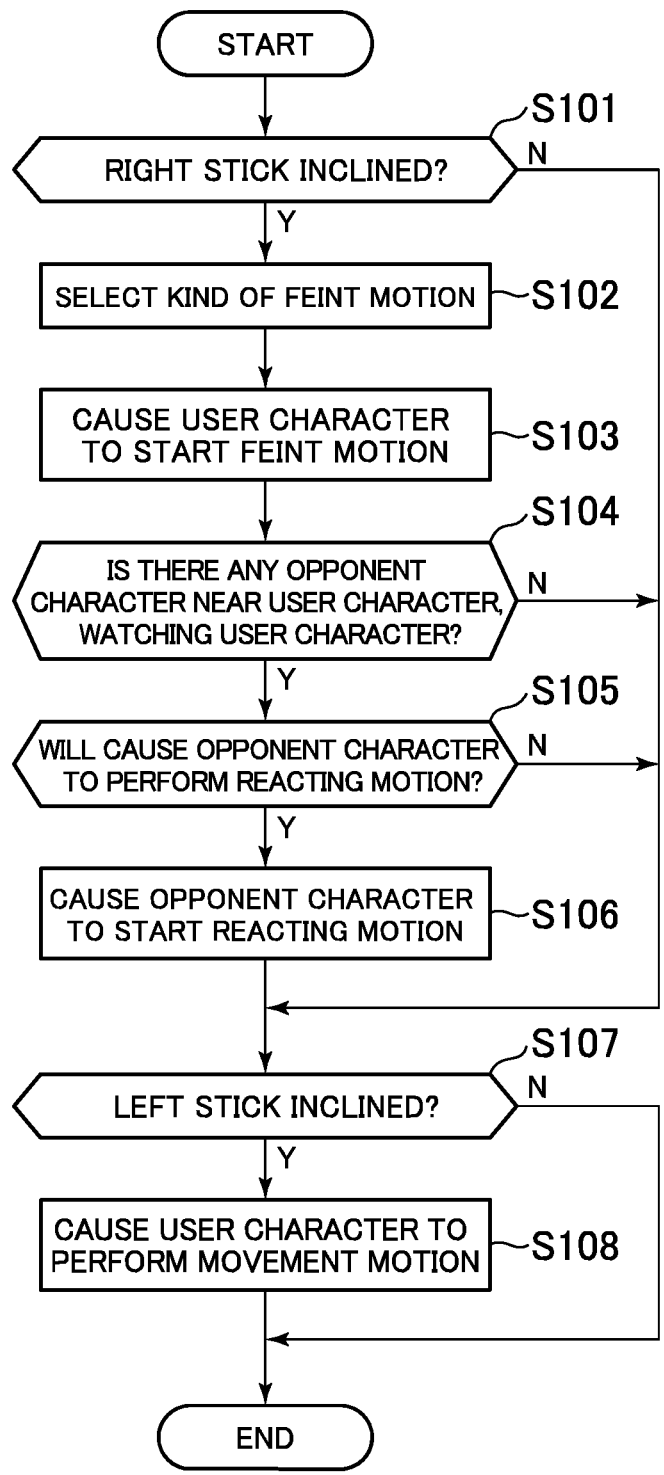

FIG.15

| DIRECTION | PARAMETER OF USER CHARACTER(xu) | FEINT MOTION DATA |
|---|---|---|
| FORWARD DIRECTION | $xu \leqq X_T$ | FEINT MOTION DATA F1 |
| | $X_T < xu$ | FEINT MOTION DATA F2 |
| REARWARD DIRECTION | $xu \leqq X_T$ | FEINT MOTION DATA B1 |
| | $X_T < xu$ | FEINT MOTION DATA B2 |
| LEFTWARD DIRECTION | $xu \leqq X_T$ | FEINT MOTION DATA L1 |
| | $X_T < xu$ | FEINT MOTION DATA L2 |
| RIGHTWARD DIRECTION | $xu \leqq X_T$ | FEINT MOTION DATA R1 |
| | $X_T < xu$ | FEINT MOTION DATA R2 |

FIG.16

| DIRECTION | PARAMETER OF OPPONENT CHARACTER(xe) | FEINT MOTION DATA |
|---|---|---|
| FORWARD DIRECTION | $xe \leqq X_T$ | FEINT MOTION DATA F1 |
| | $X_T < xe$ | FEINT MOTION DATA F2 |
| REARWARD DIRECTION | $xe \leqq X_T$ | FEINT MOTION DATA B1 |
| | $X_T < xe$ | FEINT MOTION DATA B2 |
| LEFTWARD DIRECTION | $xe \leqq X_T$ | FEINT MOTION DATA L1 |
| | $X_T < xe$ | FEINT MOTION DATA L2 |
| RIGHTWARD DIRECTION | $xe \leqq X_T$ | FEINT MOTION DATA R1 |
| | $X_T < xe$ | FEINT MOTION DATA R2 |

FIG.17

| DIRECTION | DISTANCE FROM USER CHARACTER TO BALL (du) | FEINT MOTION DATA |
|---|---|---|
| FORWARD DIRECTION | $du \leq D_T$ | FEINT MOTION DATA F1 |
| | $D_T < du$ | FEINT MOTION DATA F2 |
| REARWARD DIRECTION | $du \leq D_T$ | FEINT MOTION DATA B1 |
| | $D_T < du$ | FEINT MOTION DATA B2 |
| LEFTWARD DIRECTION | $du \leq D_T$ | FEINT MOTION DATA L1 |
| | $D_T < du$ | FEINT MOTION DATA L2 |
| RIGHTWARD DIRECTION | $du \leq D_T$ | FEINT MOTION DATA R1 |
| | $D_T < du$ | FEINT MOTION DATA R2 |

FIG.18

| DIRECTION | DISTANCE FROM OPPONENT CHARACTER TO BALL (de) | FEINT MOTION DATA |
|---|---|---|
| FORWARD DIRECTION | $de \leq D_T$ | FEINT MOTION DATA F1 |
| | $D_T < de$ | FEINT MOTION DATA F2 |
| REARWARD DIRECTION | $de \leq D_T$ | FEINT MOTION DATA B1 |
| | $D_T < de$ | FEINT MOTION DATA B2 |
| LEFTWARD DIRECTION | $de \leq D_T$ | FEINT MOTION DATA L1 |
| | $D_T < de$ | FEINT MOTION DATA L2 |
| RIGHTWARD DIRECTION | $de \leq D_T$ | FEINT MOTION DATA R1 |
| | $D_T < de$ | FEINT MOTION DATA R2 |

FIG.19

| DIRECTION | DISTANCE FROM USER CHARACTER TO OPPONENT CHARACTER (due) | FEINT MOTION DATA |
|---|---|---|
| FORWARD DIRECTION | $due \leq D_T$ | FEINT MOTION DATA F1 |
| | $D_T < due$ | FEINT MOTION DATA F2 |
| REARWARD DIRECTION | $due \leq D_T$ | FEINT MOTION DATA B1 |
| | $D_T < due$ | FEINT MOTION DATA B2 |
| LEFTWARD DIRECTION | $due \leq D_T$ | FEINT MOTION DATA L1 |
| | $D_T < due$ | FEINT MOTION DATA L2 |
| RIGHTWARD DIRECTION | $due \leq D_T$ | FEINT MOTION DATA R1 |
| | $D_T < due$ | FEINT MOTION DATA R2 |

FIG.20

| PARAMETER OF USER CHARACTER (xu) | PROBABILITY |
|---|---|
| $xu \leq X_T$ | Pa |
| $X_T < xu$ | Pb |

| PARAMETER OF OPPONENT CHARACTER (xe) | PROBABILITY |
|---|---|
| $xe \leq X_T$ | Pc |
| $X_T < xe$ | Pd |

| MOVEMENT SPEED OF USER CHARACTER(vu) | PROBABILITY |
|---|---|
| $vu \leq V_T$ | Pe |
| $V_T < vu$ | Pf |

| MOVEMENT SPEED OF OPPONENT CHARACTER(ve) | PROBABILITY |
|---|---|
| $ve \leq V_T$ | Pg |
| $V_T < ve$ | Ph |

| DISTANCE FROM USER CHARACTER TO BALL(du) | PROBABILITY |
|---|---|
| $du \leq D_T$ | Pi |
| $D_T < du$ | Pj |

| DISTANCE FROM OPPONENT CHARACTER TO BALL (de) | PROBABILITY |
|---|---|
| $de \leq D_T$ | Pk |
| $D_T < de$ | Pl |

| PARAMETER OF USER CHARACTER (xu) | REPRODUCTION SPEED |
|---|---|
| $xu \leq X_T$ | Va |
| $X_T < xu$ | Vb |

| PARAMETER OF OPPONENT CHARACTER (xe) | REPRODUCTION SPEED |
|---|---|
| $xe \leq X_T$ | Vc |
| $X_T < xe$ | Vd |

※Vc＞Vd

GAME CONTROL DEVICE, SYSTEM, AND METHOD OF CAUSING A USER CHARACTER TO PERFORM A DESIRED MOTION AMONG A PLURALITY OF KINDS OF MOTION

CROSS-REFERENCE TO RELATED APPLICATION

The present application claims priority from Japanese applications JP 2013-121313 and JP 2013-121318 filed on Jun. 7, 2013, the contents of which are hereby incorporated by reference into this application.

TECHNICAL FIELD

The present invention relates to a game control device, a game system, a game control method, and a program.

BACKGROUND ART

There is known a game in which a user character acts according to an operation by a user. For example, there is known a soccer game in which a match is executed between a soccer team (a user team) to which a user character and teammate characters belong and a soccer team (an opponent team) to which opponent characters belong, in which the user character acts according to an operation by a user. In the soccer game, the user character performs a movement motion, a feint motion (dummy motion), a pass motion, a shoot motion, or the like, according to an operation by the user.

CITATION LIST

Patent Literature

Patent Literature 1: JP 2011-065425 A

SUMMARY OF INVENTION

Technical Problem

For example, in a conventional soccer game, a user needs to perform a complicated operation in order to cause a user character to perform a desired feint motion among a plurality of kinds of feint motions (a first problem).

Further, for example, in the conventional soccer game, although the user can move the user character in a desired direction, the user cannot cause the user character to perform the feint motion in a desired direction (a second problem).

A first invention of this application has been conceived in view of the above described first problem, and an object thereof is to provide a game control device, a game system, a game control method, and a program capable of causing a user character to perform a desired motion among a plurality of kinds of motions through a simple operation.

A second invention of this application has been conceived in view of the above described second problem, and an object thereof is to provide a game control device, a game system, a game control method, and a program capable of causing a user character to perform a feint motion in a direction desired by a user.

In order to achieve the above described first problem, a game control device according to the first invention of this application is a game control device for executing a game in which a user character acts according to an operation by a user, and the game control device includes: direction obtaining means for, in a case where a direction designating operation is performed by the user, obtaining a relative direction of a direction designated through the direction designating operation relative to a forward direction of the user character; motion data selection means for selecting any of motion data correlated to a type to which the relative direction obtained by the direction obtaining means belongs from among motion data stored in means for storing the type of the relative direction relative to the forward direction of the user character and a plurality of kinds of motion data so as to be correlated to each other; and user character control means for causing the user character to perform a motion in accordance with the motion data selected by the motion data selection means.

A game system according to the first invention of this application is a game system for executing a game in which a user character acts according to an operation by a user, and the game system includes: direction obtaining means for, in a case where a direction designating operation is performed by the user, obtaining a relative direction of a direction designated through the direction designating operation relative to a forward direction of the user character; motion data selection means for selecting any of motion data correlated to a type to which the relative direction obtained by the direction obtaining means belongs from among motion data stored in means for storing the type of the relative direction relative to the forward direction of the user character and a plurality of kinds of motion data so as to be correlated to each other; and user character control means for causing the user character to perform a motion in accordance with the motion data selected by the motion data selection means.

A game control method according to the first invention of this application is a game control method for executing a game in which a user character acts according to an operation by a user, and the game control method includes: obtaining, in a case where a direction designating operation is performed by the user, a relative direction of a direction designated through the direction designating operation relative to a forward direction of the user character; selecting any of motion data correlated to a type to which the obtained relative direction belongs from among motion data stored in a storage that stores the type of the relative direction relative to the forward direction of the user character and a plurality of kinds of motion data so as to be correlated to each other; and causing the user character to perform a motion in accordance with the selected motion data.

A program according to the first invention of this application is a program for causing a computer to function as a game device for executing a game in which a user character acts according to an operation by a user, the program for causing the computer to: obtain, in a case where a direction designating operation is performed by the user, a relative direction of a direction designated through the direction designating operation relative to a forward direction of the user character; select any of motion data correlated to a type to which the obtained relative direction belongs from among motion data stored in a storage that stores the type of the relative direction relative to the forward direction of the user character and a plurality of kinds of motion data so as to be correlated to each other; and cause the user character to perform a motion in accordance with the selected motion data.

An information storage medium according to the first invention of this application is a non-transitory computer-readable information storage medium storing the above described program.

In order to achieve the above described second problem, a game control device according to the second invention of this application is a game control device for executing a game in which a user character acts according to an operation by a user, and the game control device includes: means for obtaining movement motion data stored in means for storing the movement motion data for causing the user character to perform a movement motion; means for obtaining feint motion data stored in means for storing the feint motion data that is motion data for causing the user character to perform a feint motion, a reproduction period of the feint motion data being shorter than that of the movement motion data; feint motion execution means for, in a case where the user performs a first direction designating operation, causing the user character to perform a feint motion in the direction corresponding to the first direction designating operation by reproducing the feint motion data; and movement motion execution means for, in a case where the user performs a second direction designating operation, causing the user character to perform a movement motion in the direction corresponding to the second direction designating operation by reproducing the movement motion data.

A game system according to the second invention of this application is a game system for executing a game in which a user character acts according to an operation by a user, and the game system includes: means for obtaining movement motion data stored in means for storing the movement motion data for causing the user character to perform a movement motion; means for obtaining feint motion data stored in means for storing the feint motion data that is motion data for causing the user character to perform a feint motion, a reproduction period of the feint motion data being shorter than that of the movement motion data; feint motion execution means for, in a case where the user performs a first direction designating operation, causing the user character to perform a feint motion in the direction corresponding to the first direction designating operation by reproducing the feint motion data; and movement motion execution means for, in a case where the user performs a second direction designating operation, causing the user character to perform a movement motion in the direction corresponding to the second direction designating operation by reproducing the movement motion data.

A game control method according to the second invention of this application is a game control method of a game in which a user character acts according to an operation by a user, and the game control method includes: obtaining movement motion data stored in a storage that stores the movement motion data for causing the user character to perform a movement motion; obtaining feint motion data stored in a storage that stores the feint motion data that is motion data for causing the user character to perform a feint motion, a reproduction period of the feint motion data being shorter than that of the movement motion data; causing, in a case where the user performs a first direction designating operation, the user character to perform a feint motion in the direction corresponding to the first direction designating operation by reproducing the feint motion data; and causing, in a case where the user performs a second direction designating operation, the user character to perform a movement motion in the direction corresponding to the second direction designating operation by reproducing the movement motion data.

A program according to a second invention of this application is a program for causing a computer to: obtain movement motion data stored in a storage that stores the movement motion data for causing the user character to perform a movement motion; obtain feint motion data stored in a storage that stores the feint motion data that is motion data for causing the user character to perform a feint motion, a reproduction period of the feint motion data being shorter than that of the movement motion data; cause, in a case where the user performs a first direction designating operation, the user character to perform a feint motion in the direction corresponding to the first direction designating operation by reproducing the feint motion data; and cause, in a case where the user performs a second direction designating operation, the user character to perform a movement motion in the direction corresponding to the second direction designating operation by reproducing the movement motion data.

An information storage medium according to the second invention of this application is a non-transitory computer-readable information storage medium storing the above described program.

Advantageous Effects of Invention

According to the first invention of this application, it is possible to cause a user character to perform a desired motion among a plurality of kinds of motions through a simple operation. Further, according to the second invention of this application, it is possible to cause a user character to perform a feint motion in a direction desired by a user.

BRIEF DESCRIPTION OF DRAWINGS

FIG. 11 shows one example of state data of a game character;

FIG. 14 is a flowchart of one example of processing executed in a game device according to the first embodiment;

FIG. 15 shows one example of a correlation between a combination of the type of the relative direction and the parameter of the user character and the feint motion data;

FIG. 16 shows one example of a correlation between a combination of the type of the relative direction and the parameter of the opponent character and the feint motion data;

FIG. 17 shows one example of a correlation between a combination of the type of the relative direction and the distance from the user character to the ball and the feint motion data;

FIG. 18 shows one example of a correlation between a combination of the type of the relative direction and the distance from the opponent character to the ball and the feint motion data;

FIG. 19 shows one example of a correlation between a combination of the type of the relative direction and the distance from the user character to the opponent character and the feint motion data;

FIG. 20 shows one example of information defining a correlation between the parameter of the user character and probability information;

FIG. 21 shows one example of information defining a correlation between the parameter of the opponent character and the probability information;

FIG. 22 shows one example of information defining a correlation between the movement speed of the user character and the probability information;

FIG. 23 shows one example of information defining a correlation between the movement speed of the opponent character and the probability information;

FIG. 24 shows one example of information defining a correlation between the distance from the user character to the ball and the probability information;

FIG. 25 shows one example of information defining a correlation between the distance from an opponent character to the ball and the probability information;

FIG. 26 shows one example of information defining a correlation between the parameter of the user character and the reproduction speed of the feint motion data;

FIG. 27 shows one example of information defining a correlation between the parameter of the opponent character and the reproduction speed of the feint motion data;

DESCRIPTION OF EMBODIMENTS

In the following, an example of an embodiment of the first invention of this application will be described in detail based on the drawings.

Figure 1:
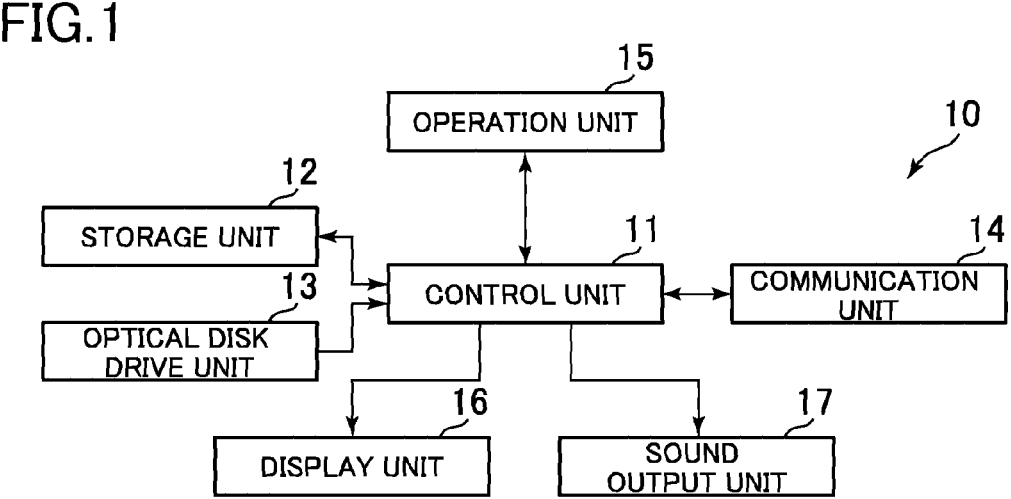
FIG. 1 shows one example of a hardware structure of a game device.

FIG. 1 shows one example of a hardware structure of a game device (a game control device) according to an embodiment of the first invention of this application (hereinafter referred to as a "first embodiment"). A game device 10 according to this embodiment is implemented using, for example, a consumer game device (a stationary type game device), a portable game device, a commercial game device, a personal computer, a portable phone (including a smart phone), or a portable information terminal (including a tablet type computer).

As shown in FIG. 1, the game device 10 includes a control unit 11, a storage unit 12, an optical disk drive unit 13, a communication unit 14, an operation unit 15, a display unit 16, and a sound output unit 17. The control unit 11 includes, for example, one or more microprocessors or the like, and executes processing according to an operating system or other program. The storage unit 12 includes a main memory unit (for example, a RAM) and an auxiliary storage unit (for example, a hard disk drive or a solid state drive).

The optical disk drive unit 13 reads a program and data recorded on an optical disk. A program and data are supplied to the game device 10 via the optical disk. The game device 10 may include a structural element for reading a program and data stored on an information storage medium (for example, a memory card) other than the optical disk, and a program and data may be supplied to the game device 10 via the information storage medium other than the optical disk.

The communication unit 14 is an interface for data communication via a communication network. A program and data may be supplied from a remote place to the game device 10 via the communication network.

Figure 2A:
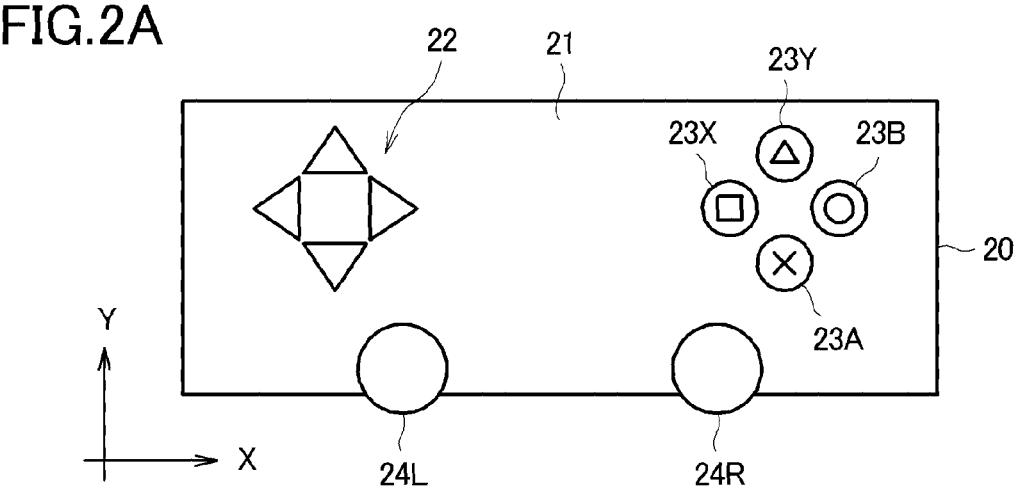
FIG. 2A shows one example of a game controller.
Figure 2B:
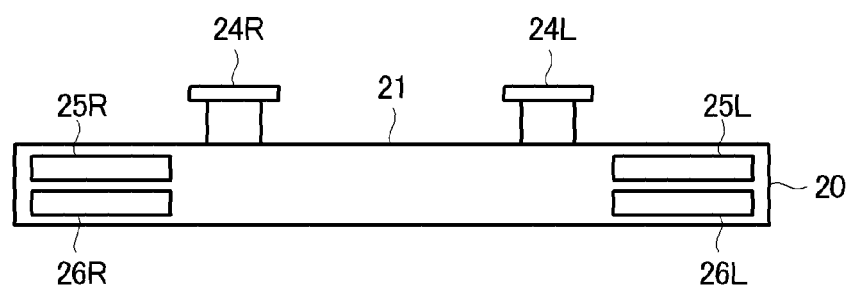
FIG. 2B shows one example of the game controller.

The operation unit 15 is used by a user to perform a game operation. For example, in the case where the game device 10 is a consumer game device, a game controller provided to the consumer game device corresponds to the operation unit 15. FIGS. 2A and 2B show one example of the game controller. As shown in FIGS. 2A and 2B, the game controller 20 has a plurality of operation members.

Specifically, as shown in FIG. 2A, direction buttons 22, buttons 23A, 23B, 23X, 23Y, a left stick (a lever) 24L, and a right stick (a lever) 24R are formed on the front surface 21 of the game controller 20. The direction buttons 22 are used to designate a direction. For example, the buttons 23A, 23B, 23X, 23Y are used to perform various game operations. The left stick 24L and the right stick 24R are also used to designate a direction, for example. The left stick 24L and the right stick 24R are standing upright on the front surface 21 of the game controller 20 and adapted for inclination in all directions from this upright state.

As shown in FIG. 2B, buttons 25L, 25R, 26L, 26R are formed on a lateral surface of the game controller 20 opposite to the user holding the game controller 20, for use in various game operations.

The states of the respective operation members of the game controller 20 are scanned every constant period (for example, every $1/60^{th}$ of a second), and an operation signal indicating the result of scanning is supplied to the control unit 11, so that an operation by the user is determined based on this operation signal. For example, a numerical value in accordance with the inclination direction of the left stick 24L (in which direction the left stick 24L is inclined from the upright state thereof) and the amount of inclination of the left stick 24L (by what angle the left stick 24L is inclined relative to the upright state thereof) is supplied to the control unit 11. This is similarly applicable to the right stick 24R. Then, the respective inclination directions and amounts of the left stick 24L and the right stick 24R are determined based on these numeric values.

Note that in the case where the game device 10 is a portable game device having operation members similar to those of the game controller 20 shown in FIG. 2, these operation members correspond to the operation unit 15. In the case where the game device 10 is a personal computer having a keyboard, a mouse, a touch pad, or the like, the keyboard, the mouse, the touch pad, or the like correspond to the operation unit 15.

In the case where the game device 10 is a portable phone or a portable information terminal having a key, a stick, or the like, the key, the stick, or the like corresponds to the operation unit 15. In the case where the game device 10 is a portable game device, a portable phone, or a portable information terminal having a touch panel formed on the display panel, the touch screen corresponds to the operation unit 15.

The display unit 16 is, for example, a liquid crystal display panel, an organic EL display, or the like, and displays a screen according to an instruction from the control unit 11. The sound output unit 17 is, for example, a speaker, headphones, or the like, and outputs sound data according to an instruction from the control unit 11.

In the game device 10, a game program is executed, whereby a game is executed. For example, a game in which a game character acts according to an operation by the user is executed. In the following, a sport game that emulates a sport that is played using a moving object will be described as one example of the game executed in the game device 10. In other words, a sport game that emulates a sport that aims to move the moving object into a predetermined target area will be described. Specifically, a soccer game will be described.

In the soccer game, a match is executed between a soccer team operated by a user and a soccer team operated by an opponent. An "opponent" may be a computer (the control unit 11) or another user. A match may be executed between a soccer team cooperatively operated by two or more users and a soccer team operated by an opponent. In this case, an "opponent" may be a computer or one or more other users.

In the following, a case will be described in which a match is executed between a soccer team operated by a user and a soccer team operated by an opponent (a computer). The soccer team operated by the user will be hereinafter referred to as a "user team", and the soccer team operated by the opponent (the computer) will be hereinafter referred to as an "opponent team".

Figure 3:
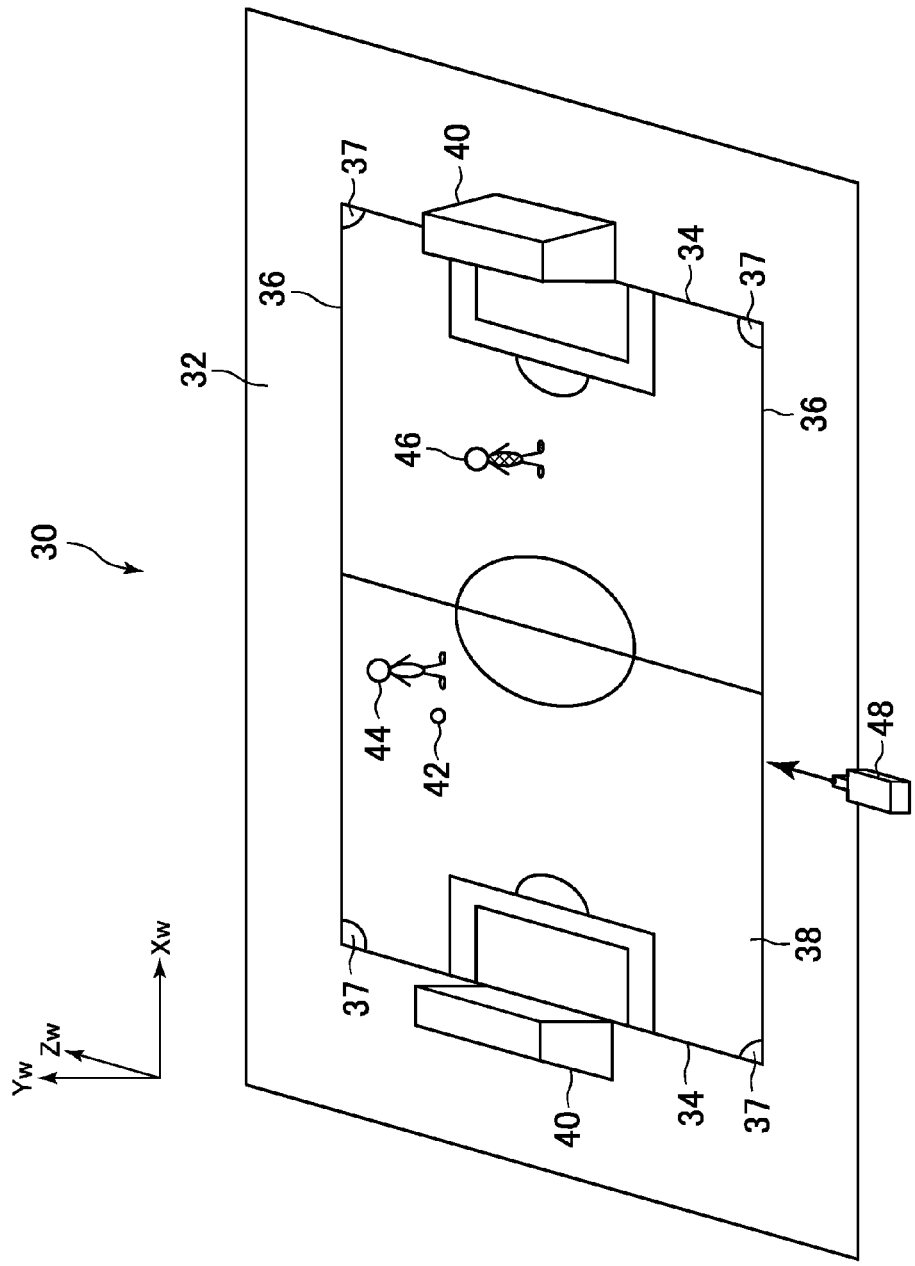
FIG. 3 shows one example of a game space.

In the soccer game, a virtual game space is created in the storage unit 12 (the main memory unit), and a match is executed in the game space. FIG. 3 shows one example of the game space. The game space 30 shown in FIG. 3 is a virtual 3D space where three mutually orthogonal coordinate axes Xw, Yw, Zw are defined.

In the game space 30, a field 32 that is an object representing a soccer field is placed. A goal line 34, a touch line 36, and a corner area 37 are shown on the field 32. A rectangular area enclosed by two goal lines 34 and two touch lines 36 is a pitch 38, where the match is executed.

A goal 40 that is an object representing a soccer goal (a target area) is placed on the field 32. A ball 42 that is an object representing a soccer ball (a moving object) is placed in the game space 30. One of the goals 40 is correlated to the user team, while the other to the opponent team. When the ball 42 has been moved into one goal 40 correlated to either one of the soccer teams, a goal event occurs for the other soccer team.

A game character 44 that is an object representing a soccer player belonging to the user team and a game character 46 that is an object representing a soccer player belonging to the opponent team are placed in the game space 30. Though not shown in FIG. 3, eleven game characters 44 belonging to the user team and eleven game characters 46 belonging to the opponent team are placed in the game space 30.

A virtual camera 48 is placed in the game space 30. A game screen showing the game space 30 viewed from the virtual camera 48 is displayed on the display unit 16. For example, the virtual camera 48 moves in the game space 30 based on the movement of the ball 42, such that the ball 42 is always shown in the game screen.

Figures 4, 5:
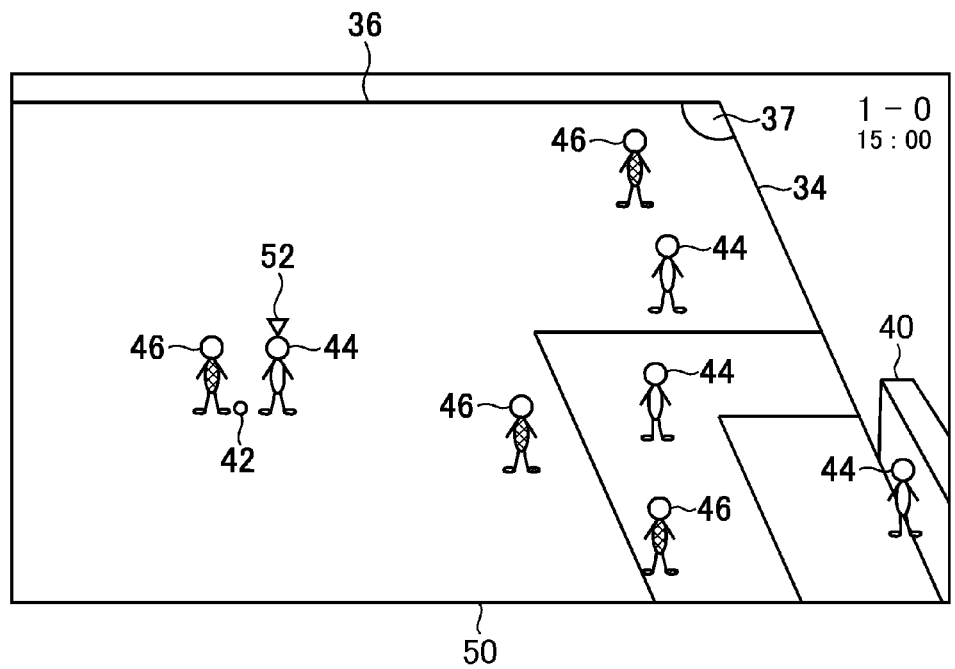
FIG. 4 shows one example of a game screen.
FIG. 5 shows one example of a correlation between a motion of a user character and an operation by a user.

FIG. 4 shows one example of the game screen. The ball 42, four game characters 44 belonging to the user team, and four game characters 46 belonging to the opponent team are displayed in the game screen 50 shown in FIG. 4.

A cursor 52 is also displayed in the game screen 50. The cursor 52 indicates a game character 44 that is a user's operation target. The game character 44 that is the user's operation target acts according to an operation by the user. The user's operation target is switched among the game characters 44 belonging to the user team. Alternatively, the user's operation target may be fixed to any one game character 44 belonging to the user team.

Meanwhile, a game character 44 that is not the user's operation target among the game characters 44 belonging to the user team is operated by the computer. A game character 46 belonging to the opponent team is also operated by the computer. For example, the game character 44 (46) operated by the computer acts based on action control data (for example, AI (artificial intelligence)). That is, the game character 44 (46) operated by the computer performs a motion determined based on the action control data.

Note that a game character 44 that is the user's operation target will be hereinafter referred to as a "user character", and a game character 44 that is not the user's operation target among the game characters 44 belonging to the user team will be hereinafter referred to as a "teammate character". Further, a game character 46 belonging to the opponent team will be hereinafter referred to as an "opponent character".

In the game device 10, it is possible to cause the user character to perform a desired feint motion (dummy motion) among a variety of feint motions, through a simple operation. In the following, this function will be described.

FIG. 5 shows one example of a correlation between a motion performed by the user character and an operation performed by the user. In FIG. 5, the cross mark, the square, and the circle represent the buttons 23A, 23X, and 23B, respectively.

In the example shown in FIG. 5, a movement motion of the user character is correlated to the left stick 24L. That is, when the user inclines the left stick 24L, the user character moves in the direction corresponding to the inclination direction of the left stick 24L. Note that in the case where the user character holds the ball 42, a movement motion performed by the user character is a dribble motion.

In the example shown in FIG. 5, a feint motion of the user character is correlated to the right stick 24R. The "feint motion" is, for example, a feint motion (dummy motion) relating to a movement motion of the user character and a motion of the user character faking to move in a direction designated by the user. In other words, the "feint motion" is a movement motion of the user character that suddenly stops halfway. Once the user character stops the movement motion halfway, the user character does not move. Note that when the user character holds the ball 42, the "feint motion" may be a motion of the user character faking to pass the ball 40 in a direction designated by the user. In the following, a case will be described in which the "feint motion" is a motion of the user character faking to move in a direction designated by the user.

Figures 6, 7:
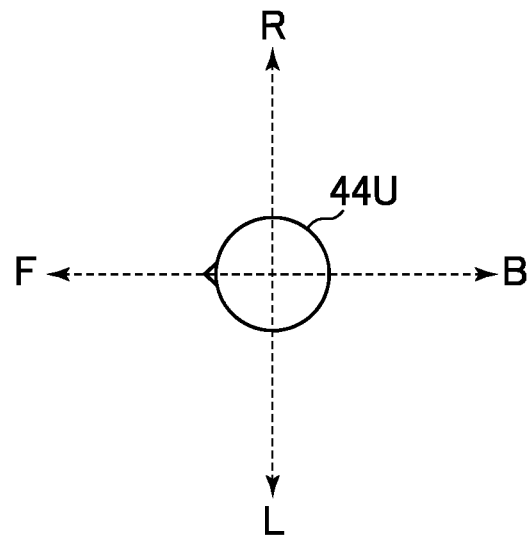
FIG. 6 shows one example of a correlation between the type of a relative direction and feint motion data.
FIG. 7 explains the relative direction.

The user inclines the right stick 24R to thereby select a desired feint motion and cause the user character to perform that feint motion. In this embodiment, feint motion data is stored so as to be correlated to the type of a relative direction relative to the forward direction of the user character. FIG. 6 shows one example of a correlation between the above described relative direction and the feint motion. In the example shown in FIG. 6, two or more kinds of feint motion data are correlated to each of the "forward direction", "rearward direction", "leftward direction", and "rightward direction".

FIG. 7 explains the "forward direction", "rearward direction", "leftward direction", and "rightward direction" shown in FIG. 6. The "forward direction" refers to the forward direction F (a forward direction) of the user character 44U; the "rearward direction" refers to the rearward direction B of the user character 44U (the opposite direction to the forward direction); the "leftward direction" refers to the leftward direction L of the user character 44U (left relative to the forward direction); the "rightward direction" refers to the rightward direction R of the user character 44U (right relative to the forward direction). Note that the relative directions correlated to the feint motion data are not limited to these four directions.

The feint motion data is data for causing the user character to perform a feint motion. In other words, the feint motion data is data indicating a change in the posture of the user character engaged in the feint motion. That is, the feint motion data is data indicating a posture in every frame (for example, $1/30^{th}$ or $1/60^{th}$ of a second), of the user character performing the feint motion. Note that changing the posture of the user character based on the feint motion data to thereby cause the user character to perform the feint motion will be hereinafter described as "reproducing the feint motion data".

In the example shown in FIG. 6, two or more kinds of feint motion data (feint motion data F1, F2, and the like) are correlated to the "forward direction". For example, feint motion data for causing the user character to perform a feint motion of pretending to move forward is correlated to the "forward direction". Specifically, feint motion data for causing the user character holding the ball 42 to perform a feint motion of moving further forward than the ball 42 to thereby pretend to move forward is correlated to the "forward direction". More specifically, feint motion data for causing the user character to perform a feint motion referred to as "roulette" or "edge turn", for example, is correlated to the "forward direction".

When the user inclines the right stick 24R in the direction corresponding to the forward direction of the user character, any of the plurality of kinds of feint motion data correlated to the "forward direction" is selected, and the user character performs the feint motion based on the feint motion data.

In this case, the "direction corresponding to the forward direction of the user character" includes not only the direction completely coincident with the forward direction of the user character, but also a direction displaced from the forward direction of the user character by an amount equal to or smaller than a threshold.

In this case, any of the plurality of kinds of feint motion data may be selected at random, or may be selected based on predetermined information. A case will be described below in which any of the plurality of kinds of feint motion data is selected at random. Note that a case in which any of the plurality of kinds of feint motion data is selected based on predetermined information will be described later (see FIGS. 15 to 19).

In the example shown in FIG. 6, a plurality of kinds of feint motion data (feint motion data B1, B2, and the like) are correlated to the "rearward direction". For example, feint motion data for causing the user character to perform a feint motion of pretending to move rearward is correlated to the "rearward direction". Specifically, feint motion data for causing the user character holding the ball 42 to perform a feint motion for drawing the ball 42 closer to itself to thereby pretend to retreat rearward is correlated to the "rearward direction".

When the user inclines the right stick 24R in the direction corresponding to the rearward direction of the user character, any of the plurality of kinds of feint motion data correlated to the "rearward direction" is selected, and the user character performs a feint motion based on the feint motion data.

Further, in the example shown in FIG. 6, a plurality of kinds of feint motion data (feint motion data L1, L2, and the like) are correlated to the "leftward direction". For example, feint motion data for causing the user character to perform a feint motion of pretending to move leftward is correlated to the "leftward direction".

When the user inclines the right stick 24R in the direction corresponding to the leftward direction of the user character, any of the plurality of kinds of feint motion data correlated to the "leftward direction" is selected, and the user character performs a feint motion based on the feint motion data.

Similarly, in the example shown in FIG. 6, a plurality of kinds of feint motion data (feint motion data R1, R2, and the like) are correlated to the "rightward direction". For example, feint motion data for causing the user character to perform a feint motion of pretending to move rightward is correlated to the "rightward direction".

When the user inclines the right stick 24R in the direction corresponding to the rightward direction of the user character, any of the plurality of kinds of feint motion data correlated to the "rightward direction" is selected, and the user character performs a feint motion based on the feint motion data.

Note that a feint motion may be performed not only when the user character holds the ball 42 but also when the user character does not holding the ball 42. For example, a feint motion is also performed when the user character is defending against an opponent character holding the ball 42.

Figure 8:
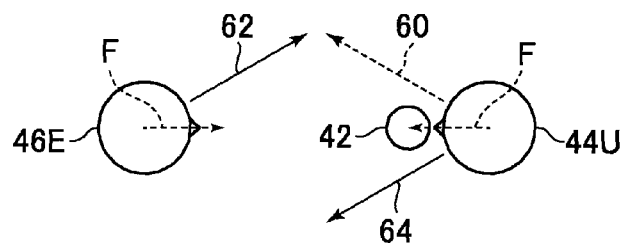
FIG. 8 explains one example of a feint motion performed by the user character when the user character holds the ball.

FIG. 8 explains one example of a feint motion performed by the user character 44U when the user character 44U is holding the ball 42. The reference letter "F" in FIG. 8 indicates the respective forward direction (the respective frontward direction) of the user character 44U and of the opponent character 46E. FIG. 8 shows a situation in which the user character 44U holding the ball 42 is facing the opponent character 46E, and trying to dribble past the opponent character 46E. Dribbling past the opponent character 46E refers to moving behind the opponent character 46E together with the ball 42 while trying not to be deprived of the ball 42 by the opponent character 46E.

In this case, for example, the user inclines the right stick 24R in the direction corresponding to the rightward direction R of the user character 44U (see FIG. 7). With this operation, the user character 44U performs a feint motion in a first direction 60 (the right forward direction of the user character 44U). That is, the user character 44U moves the upper part of the user character 44U body as if moving in the first direction 60 to thereby pretend to move in the first direction 60.

When the opponent character 46E is misled by the feint motion of the user character 44U, the opponent character 46E moves in a second direction 62 that is a direction against the first direction 60, in order to block the user character 44U dribbling in the first direction 60.

In this case, the user inclines the left stick 24L in the direction corresponding to a third direction 64 that is a direction opposite to the movement direction (the second direction 62) of the opponent character 46E, in order to dribble past the opponent character 46E. With this operation, the user character 44U moves in the third direction 64 to dribble past the opponent character 46E having moved in the second direction 62.

Figure 9:
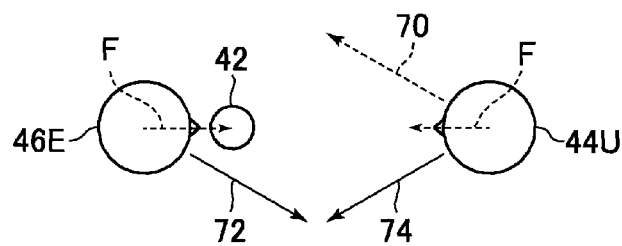
FIG. 9 explains one example of a feint motion performed by the user character when the user character is defending against an opponent character holding the ball.

FIG. 9 explains an example of a feint motion performed by the user character 44U when the user character 44U is defending against the opponent character 46E holding the ball 42. The reference letter "F" in FIG. 9 indicates the respective forward direction (the respective frontward direction) of the user character 44U and of the opponent character 46E. FIG. 9 shows a situation in which the user character 44U is facing the opponent character 46E holding the ball 42 and defending against the opponent character 46E.

In this case, for example, the user inclines the right stick 24R in the direction corresponding to the rightward direction R of the user character 44U (see FIG. 7). With this operation, the user character 44U performs a feint motion in a first direction 70 (the right forward direction of the user character 44U). That is, the user character 44U moves the upper part of the user character 44U body as if moving in the first direction 70 to thereby pretend to move in the first direction 70.

When the opponent character 46E is misled by the feint motion of the user character 44U, the opponent character 46E dribbles in a second direction 72 that is a direction opposite to the first direction 70, in order to dribble in the direction opposite to the direction (the first direction 70) in which the user character 44U moves.

In this case, the user inclines the left stick 24L in the direction corresponding to a third direction 74 that is a direction against the direction (the second direction 72) in which the opponent character 46E is dribbling, in order to block the opponent character 46E dribbling. With this operation, the user character 44U moves toward the opponent character 46E and deprives the opponent character 46E of the ball 42.

As described above, in the game device 10, it is possible to cause the user character to perform a desired feint motion among a variety of feint motions through a simple operation of designating a direction. Specifically, it is possible to cause the user character to perform a feint motion in a desired direction through a simple operation. Further, in the game device 10, as feint motion data is stored so as to be correlated to the type of the relative direction relative to the forward direction of the user character (see FIG. 6), as described above, it is possible to cause the user character to perform a feint motion in a desired direction through an intuitive operation of designating a relative direction relative to the forward direction of the user character.

In the example shown in FIG. 5, a motion other than a movement motion and a feint motion is also mentioned. For example, a motion to be performed when the user character holds the ball 42 is mentioned. Specifically, a short pass motion is correlated to the button 23A, a long pass motion is correlated to the button 23B, and a shoot motion is correlated to the button 23X. Therefore, when the user presses any of these buttons while the user character is holding the ball 42, the user character performs the short pass motion, the long pass motion, or the shoot motion.

Further, in the example shown in FIG. 5, a motion to be performed when, for example, an opponent character holds the ball 42 is mentioned. Specifically, a press motion (a press defense motion) is correlated to the button 23A, and a tackle motion is correlated to the button 23B. Therefore, when the user presses any of these buttons while the opponent character holds the ball 42, the user character performs the press motion or the tackle motion. Note that the press motion refers to a motion of the user character approaching the opponent character, while a tackle motion refers to a motion of the user character depriving the opponent character of the ball.

Figure 10:
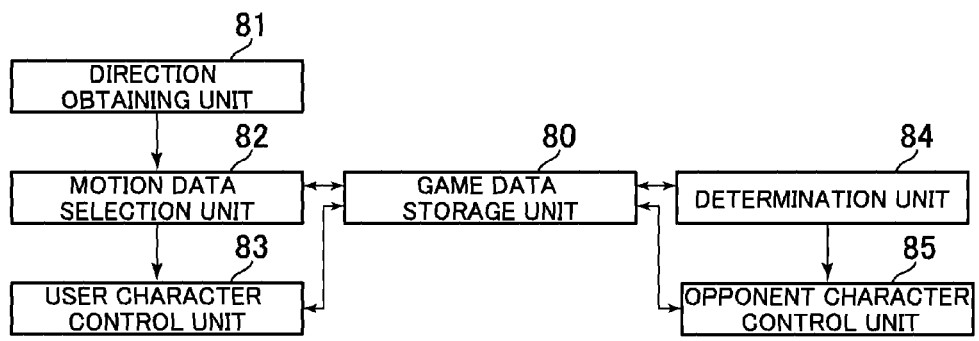
FIG. 10 is a functional block diagram showing one example of functional blocks implemented in a game device according to a first embodiment.

In the following, a structure for causing the user character to perform a desired feint motion among a plurality of kinds of feint motions through a simple operation will be described. FIG. 10 is a functional block diagram showing one example of the functional blocks implemented in the game device 10 according to the first embodiment. As shown in FIG. 10, the game device 10 according to the first embodiment includes a game data storage unit 80, a direction obtaining unit 81, a motion data selection unit 82, a user character control unit 83, a determination unit 84, and an opponent character control unit 85.

For example, the game data storage unit 80 is implemented using at least one of the storage unit 12 and an optical disk. Alternatively, the game data storage unit 80 may be implemented using a storage unit included in another device accessible from the game device 10. That is, all or some of the data stored in the game data storage unit 80 may be stored in a storage unit included in another device accessible from the game device 10.

For example, the functional blocks other than the game data storage unit 80 are implemented by the control unit 11. That is, the control unit 11 executes processing according to a program, thereby functioning as the functional blocks other than the game data storage unit 80.

In the game data storage unit 80, data that is necessary to execute a game is stored. For example, model data (shape data) of an object placed in the game space 30 is stored in the game data storage unit 80.

Further, for example, motion data of the game character 44 (46) is stored in the game data storage unit 80. Motion data is data that defines a change in the posture of the game character (46) performing a motion. In other words, the motion data indicates a posture in every frame (for example, $\frac{1}{30}^{th}$ or $\frac{1}{60}^{th}$ of a second), of the game character 44 (46) performing a motion. Note that changing the posture of the game character 44 (46) based on the motion data to thereby cause the game character 44 (46) to perform a motion is described as "reproducing the motion data".

In the game data storage unit 80, for example, movement motion data for causing the game character 44 (46) to perform a movement motion and feint motion data for causing the game character 44 (46) to perform a feint motion are stored. As described above, the feint motion data is stored so as to be correlated to the type of the relative direction relative to the forward direction of the game character 44 (46) (see FIG. 6).

The reproduction period of the feint motion data is shorter, compared to that of the movement motion data. The "reproduction period" means a period of time necessary to reproduce the motion data from the head to end thereof. In other words, the "reproduction period" means the number of frames of the motion data.

As the reproduction period of the feint motion data is shorter, compared to that of the movement motion data, as described above, in the example shown in FIG. 8, for example, the feint motion of the user character 44U in the first direction 60 (that is, reproduction of the feint motion data) is completed earlier than the movement motion of the opponent character 46E in the second direction 62 (that is, reproduction of the movement motion data). Therefore, the user character 44U can move in the third direction 64 before completion of the movement motion of the opponent character 46E in the second direction 62. As a result, the user character 44U can dribble past the opponent character 46E.

Similarly, in the example shown in FIG. 9, the feint motion of the user character 44U in the first direction 70 (that is, reproduction of the feint motion data) is completed earlier than the movement motion of the opponent character 46E in the second direction 72 (that is, reproduction of the movement motion data). Therefore, the user character 44U can move in the third direction 74 before completion of the movement motion of the opponent character 46E in the second direction 72. As a result, the user character 44U can block the opponent character 46E dribbling.

The motion data is not limited to the movement motion data and the feint motion data. For example, short pass motion data for causing a game character 44 (46) to perform a short pass motion, shoot motion data for causing a game character 44 (46) to perform a shoot motion, and the like, are also stored in the game data storage unit 80.

Data other than the model data and the motion data is stored in the game data storage unit 80. For example, game situation data indicating a current situation of a game (a match) is stored in the game data storage unit 80. Game processing is executed for every predetermined period of time (for example, $1/30^{th}$ or $1/60^{th}$ of a second), as a result, the game situation data is updated.

For example, the game situation data includes data such as is shown below:
(1) state data of the ball 42 (position data, movement direction data, and the like);
(2) state data of the game characters 44 and 46;
(3) state data of the virtual camera 48 (position data, viewing direction data, and the like);
(4) score data; and
(5) elapsed period of time data.

FIG. 11 shows one example of the state data of the game characters 44 and 46. As shown in FIG. 11, the state data of the game characters 44 and 46 includes "ID", "name", "position", "orientation", "movement speed", "motion data", "reproduction position", "ball holding flag", "operation target flag", "ability parameter", and "state parameter" fields.

The "ID" field indicates identification information for uniquely identifying a game character 44 (46). Note that "C101" to "C111" indicate the IDs of the game characters 44 belonging to the user team, and "C201" to "C211" indicate the IDs of the game characters 46 belonging to the opponent team. The "name" field indicates the name (the player name) of the game character 44 (46).

The "position" field indicates the current position of the game character 44 (46). The "orientation" field indicates the direction in which the game character 44 (46) is currently directed. For example, the "orientation" field indicates either the forward direction, the movement direction, or the viewing direction of the game character 44 (46). The "movement speed" field indicates the current movement speed of the game character 44 (46).

The "motion data" field indicates the type of the motion data being reproduced. The "reproduction position" field indicates the current reproduction position of the motion data. The "motion data" and "reproduction position" fields indicate the type of the motion currently being performed by the game character 44 (46) and the current posture of the game character 44 (46), respectively.

The "ball holding flag" field indicates whether or not the game character 44 (46) holds the ball 42. For example, the value "0" or "1" is registered in the "ball holding flag" field. The value "0" indicates that the game character 44 (46) does not hold the ball 42 while the value "1" indicates that the game character 44 (46) holds the ball 42.

The "operation target flag" field indicates whether or not the game character 44 is the user's operation target. For example, the value "0" or "1" is registered in the "operation target flag" field. The value "0" indicates that the game character 44 is not the user's operation target, while the value "1" indicates that the game character 44 is the user's operation target.

The "ability parameter" field indicates ability parameters relating to various abilities of the game character 44 (46). For example, parameter values respectively indicating dribble, pass, shoot, or defense ability are registered in the "ability parameter" field.

The "state parameter" field indicates a state parameter relating to the state of the game character 44 (46). For example, a parameter value indicating how good the condition is registered in the "state parameter" field. Further, for example, a parameter value indicating the extent of tiredness or the amount of stamina remaining is registered in the "state parameter" field. Normally, a higher value of the state parameter indicates a better condition, although alternatively, a lower value of the state parameter may indicate a better condition.

When the condition is bad, when the extent of tiredness is high, or when no stamina remains, the inherent ability of the game character 44 (46) cannot be realized. Therefore, the value of the ability parameter of the game character 44 (46) is corrected based on the state parameter of the game character 44 (46), such that the ability of the game character 44 (46) becomes lower than that in a normal condition. That is, when the condition is bad, when the extent of tiredness is high, or when no stamina remains, the value of the ability parameter is corrected such that the ability of the game character 44 (46) becomes lower than that in the normal condition.

When the user performs a direction designating operation (hereinafter referred to as a "first direction designating operation" for a convenience sake), the direction obtaining unit 81 obtains a relative direction of the direction designated through the first direction designating operation, relative to the forward direction of the user character. In the case of the above described soccer game, a game character 44 that is the user's operation target corresponds to the "user character".

The "first direction designating operation" is an operation of designating a direction and is, for example, an operation of designating a direction using a first operation member. In the case of the above described soccer game, the right stick 24R corresponds to the "first operation member".

For example, in the case where the game controller 20 or the game device 10 has a detection unit for detecting a motion of the main body of the game controller 20, an operation of moving the game controller 20 to thereby designate a direction may correspond to the "first direction designating operation".

Further, for example, in the case where the game device 10 is a portable game device, a portable phone, or a portable information terminal incorporating a sensor (for example, an acceleration sensor, a gyrosensor, or the like) for detecting a motion of the main body of the portable game device, the portable phone, or the portable information terminal, an operation of moving the main body of the game device 10 (the main body of the portable game device, the portable phone, or the portable information terminal) to thereby designate a direction may correspond to the "first direction designating operation".

Further, for example, in the case where the game device 10 is a portable game device, a portable phone, or a portable information terminal having a touch screen, an operation of designating a direction using the touch screen may correspond to the "first direction designating operation". Specifically, an operation of designating a direction by sliding a finger or a touch pen on the touch screen or an operation of designating a direction by using an image (for example, a stick image or a button image) shown on the touch screen may correspond to the "first direction designating operation".

The motion data selection unit 82 selects any of the motion data correlated to the type to which the relative direction obtained by the direction obtaining unit 81 belongs from among the motion data stored in the game data storage unit 80.

In the case of the above described soccer game, the motion data selection unit 82 selects any of the feint motion data correlated to the type to which the relative direction obtained by the direction obtaining unit 81 belongs from among the feint motion data stored in the game data storage unit 80. For example, when the user inclines the right stick 24R in the direction corresponding to the forward direction of the user character, the motion data selection unit 82 selects any of the feint motion data (for example, the feint motion data F1, F2, and the like) correlated to the "forward direction".

The user character control unit 83 controls the user character based on an operation by the user. That is, the user character control unit 83 causes the user character to perform various motions based on an operation by the user.

For example, the user character control unit 83 causes the user character to perform a motion in accordance with the motion data selected by the motion data selection unit 82. That is, the user character control unit 83 reproduces the motion data selected by the motion data selection unit 82, to thereby cause the user character to perform a motion.

In the case of the above described soccer game, the user character control unit 83 causes the user character to perform a feint motion. That is, the user character control unit 83 reproduces the feint motion data selected by the motion data selection unit 82, to thereby cause the user character to perform a feint motion.

Further, in the case of the above described soccer game, the user character control unit 83 causes the user character to perform a movement motion. That is, when the user performs a direction designating operation (hereinafter referred to as a "second direction designating operation" for a convenience sake), the user character control unit 83 reproduces the movement motion data, to thereby cause the user character to perform a movement motion of moving in the direction designated through the second direction designating operation.

Note here that the "second direction designating operation" refers to an operation of designating a direction but is different from the first direction designating operation. For example, the "second direction designating operation" refers to an operation of designating a direction using a second operation member that is different from the first operation member. In the case of the above described soccer game, the left stick 24L corresponds to the "second operation member".

For example, in the case where the game controller 20 or the game device 10 has a detection unit for detecting a motion of the main body of the game controller 20, an operation of moving the game controller 20 to thereby designate a direction may correspond to the "second direction designating operation".

Further, for example, in the case where the game device 10 is a portable game device, a portable phone, or a portable information terminal incorporating a sensor (for example, an acceleration sensor, a gyrosensor, or the like) for detecting a motion of the main body of the portable game device, the portable phone, or the portable information terminal, an operation of moving the main body of the game device 10 (the main body of the portable game device, the portable phone, or the portable information terminal) to thereby designate a direction may correspond to the "second direction designating operation".

For example, in the case where the game device 10 is a portable game device, a portable phone, or a portable information terminal having a touch screen, specifically, an operation of designating a direction by sliding a finger or a touch pen on the touch screen or an operation of designating a direction by using an image (for example, a stick image or a button image) shown on the touch screen may correspond to the "second direction designating operation".

When the user character performs a motion, the determination unit 84 determines, based on predetermined information, whether or not to cause an opponent character, or a game character opposing the user character, to perform a motion (hereinafter referred to as a "reacting motion") of reacting to the motion of the user character.

In the case of the above described soccer game, the game character 46 belonging to the opponent team corresponds to the "opponent character". Further, in the above described soccer game, when the user character performs a feint motion (in other words, when the first direction designating operation for causing the user character to perform a feint motion is performed), the determination unit 84 determines whether or not to cause the opponent character to perform the reacting motion.

The "reacting motion" will be described. The "reacting motion" is a motion, for example, of falling for of the feint motion of the user character. In other words, the "reacting motion" is a motion performed when being deceived by the feint motion of the user character. In other words, the "reacting motion" is a motion of moving that is triggered by the feint motion of the user character.

Assume a case shown in FIG. 8. That is, assume a case in which the user character 44U holding the ball 42 is trying to dribble past the opponent character 46E. In this case, a motion of moving in the direction (the first direction 60) in which the user character 44U pretends to move corresponds to the "reacting motion". That is, a motion of moving in the second direction 62 shown in FIG. 8 corresponds to the "reacting motion".

Further, assume a case shown in FIG. 9. That is, assume a case in which the user character 44U is trying to block the opponent character 46E holding the ball 42 and dribbling. In this case, a motion of moving in the direction (the second direction 72) opposite from the direction (the first direction 70) in which the user character 44U pretends to move corresponds to the "reacting motion".

When there is an opponent character who should be caused to perform the above described reacting motion, the determination unit 84 determines whether or not to cause the opponent character to perform the reacting motion.

For example, in the case where the position and orientation of an opponent character have a predetermined relationship with the position of the user character, the determination unit 84 determines that the opponent character is the "opponent character who should be caused to perform the reacting motion".

The "predetermined relationship" here refers to a relationship in which, for example, the opponent character is present near the user character, and the opponent character is watching the user character.

Figure 12:
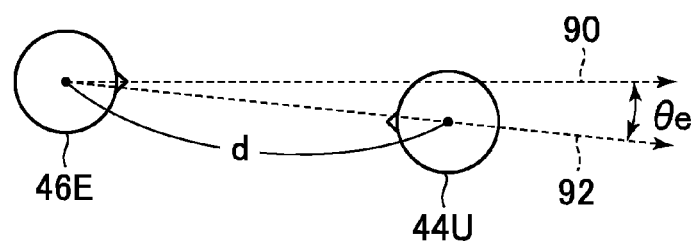
FIG. 12 explains one example of processing for determining whether or not the position and orientation of an opponent character has a predetermined relationship with the position of the user character.

FIG. 12 explains one example of processing for determining whether or not the opponent character and the user character hold the above described relationship. For example, the determination unit 84 determines whether or not the two conditions A and B below are satisfied:

(A) the distance (d) between the user character 44U and the opponent character 46E is equal to or shorter than a reference distance; and (B) the angle (θe) between the forward direction 90 of the opponent character 46E and the direction 92 from the opponent character 46E to the user character 44U is equal to or smaller than a reference angle.

When these two conditions A and B are both satisfied, the determination unit 84 determines that the opponent character 46E and the user character 44U hold the above described relationship, and then determines that the opponent character 46E is the "opponent character who should be caused to perform the reacting motion".

Note that the "predetermined relationship" may also refer to a relationship, for example, in which the opponent character is present near the user character, and the opponent character and the user character are watching each other.

Figure 13:
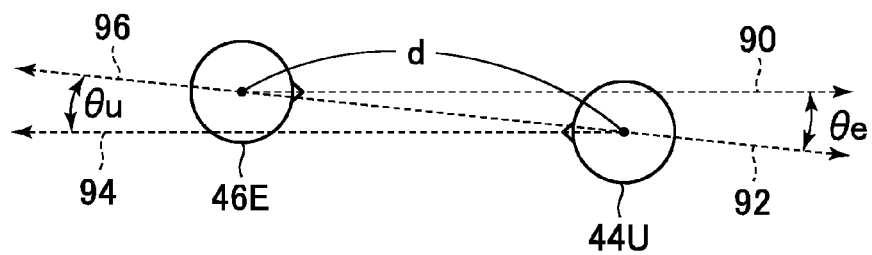
FIG. 13 explains one example of processing for determining whether or not the position and orientation of the opponent character has the predetermined relationship with the position of the user character.

FIG. 13 explains one example of processing for determining whether or not the opponent character and the user character hold such a relationship. For example, the determination unit 84 determines whether or not the three conditions A to C mentioned below are satisfied:

(A) the distance (d) between the user character 44U and the opponent character 46E is equal to or shorter than a reference distance;

(B) the angle (θe) between the forward direction 90 of the opponent character 46E and the direction 92 from the opponent character 46E to the user character 44U is equal to or smaller than a reference angle; and (C) the angle (θu) between the forward direction 94 of the user character 44U and the direction 96 from the user character 44U to the opponent character 46E is equal to or smaller than a reference angle.

In the case where these three conditions A to C are all satisfied, the determination unit 84 determines that the opponent character 46E and the user character 44U hold the predetermined relationship, and then determines that the opponent character 46E is the "opponent character who should be caused to perform the reacting motion".

When there is the "opponent character who should be caused to perform the reacting motion", the determination unit 84 determines, based on predetermined information, whether or not to cause the opponent character to perform the reacting motion.

Below, four examples will be described as specific examples of the above described "predetermined information".

[1] For example, the "predetermined information" is probability information indicating a probability of determining to cause the opponent character to perform the reacting motion. That is, the determination unit 84 determines, based on the probability information, whether or not to cause the opponent character to perform the reacting motion.

[2] For example, the "predetermined information" may be the ability parameter or the state parameter of the user character. That is, the determination unit 84 may determine whether or not to cause the opponent character to perform the reacting motion, based on the ability parameter or the state parameter of the user character. Specifically, when a predetermined ability of the user character is high, the determination unit 84 may determine to cause the opponent character to perform the reacting motion.

For example, the determination unit 84 determines whether or not the value of the predetermined ability parameter of the user character is included in a reference range. The "reference range" is a range of a parameter value indicating a high predetermined ability of the user character. Then, the determination unit 84 determines, based on the result of the above described determination, whether or not to cause the opponent character to perform the reacting motion.

Specifically, in the case where the value of the predetermined ability parameter of the user character is included in the reference range, the determination unit 84 determines to cause the opponent character to perform the reacting motion. Meanwhile, when the value of the predetermined ability parameter of the user character is not included in the reference range, the determination unit 84 determines not to cause the opponent character to perform the reacting motion.

Note that an ability parameter such as is described below, for example, may be used as the above described "predetermined ability parameter".

For example, when the user character 44U holding the ball 42 is trying to dribble past the opponent character 46E, as shown in FIG. 8, the dribble ability parameter may be used as the "predetermined ability parameter". In this manner, it may be determined to cause the opponent character 46E to perform the motion (the reacting motion) of reacting to the feint motion of the user character 44U when the user character 44U with high dribble ability is holding the ball 42 and performs the feint motion.

Further, for example, when the user character 44U is trying to block the opponent character 46E holding the ball 42 and dribbling, as shown in FIG. 9, the defense ability parameter may be used as the "predetermined ability parameter". In this manner, it may be determined to cause the opponent character 46E to perform the motion (the reacting motion) of reacting to the feint motion of the user character 44U when the user character 44U with high defense ability is trying to block the opponent character 46E dribbling and performs the feint motion.

[3] For example, the "predetermined information" may be the ability parameter or the state parameter of the opponent character. That is, the determination unit 84 may determine whether or not to cause the opponent character to perform the reacting motion, based on the ability parameter or the state parameter of the opponent character. Specifically, when a predetermined ability of the opponent character is low, the determination unit 84 may determine to cause the opponent character to perform the reacting motion.

For example, the determination unit 84 determines whether or not the value of the predetermined ability parameter of the opponent character is included in a reference range. The "reference range" here is a range of a parameter value indicating a low predetermined ability of the opponent character. Then, the determination unit 84 determines, based on the result of determination, whether or not to cause the opponent character to perform the reacting motion.

Specifically, in the case where the value of the predetermined ability parameter of the opponent character is included in the reference range, the determination unit 84 determines to cause the opponent character to perform the reacting motion. Meanwhile, when the value of the predetermined ability parameter of the opponent character is not included in the reference range, the determination unit 84 determines not to cause the opponent character to perform the reacting motion.

Note that an ability parameter such as is described below, for example, may be used as the above described "predetermined ability parameter".

For example, when the user character 44U holding the ball 42 is trying to dribble past the opponent character 46E, as shown in FIG. 8, the defense ability parameter may be used as the "predetermined ability parameter". In this manner, it may be determined to cause the opponent character 46E to perform the motion (the reacting motion) of reacting to the feint motion of the user character 44U when the defense ability of the opponent character 46E is low.

Further, for example, when the user character 44U is trying to block the opponent character 46E holding the ball 42 and dribbling, as shown in FIG. 9, the dribble ability parameter may be used as the "predetermined ability parameter". In this manner, it may be determined to cause the opponent character 46E to perform the motion (the reacting motion) of reacting to the feint motion of the user character 44U when the dribble ability of the opponent character 46E is low.

[4] For example, the "predetermined information" may be both of the ability parameter or the state parameter of the user character and the ability parameter or the state parameter of the opponent character. That is, the determination unit 84 may determine whether or not to cause the opponent character to perform the reacting motion based on both of the ability parameter or the state parameter of the user character and the ability parameter or the state parameter of the opponent character.

For example, the determination unit 84 determines whether or not to cause the opponent character to perform a reacting motion based on a result of comparison between a predetermined ability parameter of the user character and a predetermined ability parameter of the opponent character. Specifically, when a predetermined ability of the user character is higher than a predetermined ability of the opponent character, the determination unit 84 determines to cause the opponent character to perform the reacting motion. Meanwhile, when the predetermined ability of the user character is lower than the predetermined ability of the opponent character, the determination unit 84 determines not to cause the opponent character to perform the reacting motion.

Note that an ability parameter such as is described below, for example, may be used as the above described "predetermined ability parameter".

For example, when the user character 44U holding the ball 42 is trying to dribble past the opponent character 46E, as shown in FIG. 8, the dribble ability parameter of the user character 44U may be used as the "predetermined ability parameter of the user character", and the defense ability parameter of the opponent character 46E may be used as the "predetermined ability parameter of an opponent character". In this manner, it may be determined to cause the opponent character 46E to perform the motion (the reacting motion) of reacting to the feint motion of the user character 44U when the dribble ability of the user character 44U is high, compared to the defense ability of the opponent character 46E.

Further, for example, when the user character 44U is trying to block the opponent character 46E holding the ball 42 and dribbling, as shown in FIG. 9, the defense ability parameter of the user character 44U may be used as the "predetermined ability parameter of the user character", and the dribble ability parameter of the opponent character 46E may be used as the "predetermined ability parameter of an opponent character". In this manner, it may be determined to cause the opponent character 46E to perform the motion (the reacting motion) of reacting to the feint motion of the user character 44U when the defense ability of the user character 44U is high, compared to the dribble ability of the opponent character 46E.

The opponent character control unit 85 controls the opponent character. For example, the opponent character control unit 85 causes the opponent character to perform the reacting motion, depending on the result of determination by the determination unit 84. That is, when the determination unit 84 determines to cause the opponent character to perform the reacting motion, the opponent character control unit 85 causes the opponent character to perform the reacting motion. Meanwhile, when the determination unit 84 determines not to cause the opponent character to perform the reacting motion, the opponent character control unit 85 does not cause the opponent character to perform the reacting motion.

In the following, processing that is executed in the game device 10 according to the first embodiment to implement the above described functional blocks will be described. FIG. 14 is a flowchart of one example of processing that is executed to cause the user character to perform a feint motion or a movement motion, among the processing executed in the game device 10 according to the first embodiment. The processing shown in FIG. 14 is repetitively executed in the game. The control unit 11 executes the processing shown in FIG. 14 according to a program, thereby functioning as the direction obtaining unit 81, the motion data selection unit 82, the user character control unit 83, the determination unit 84, and the opponent character control unit 85. As shown in FIG. 14, initially, the control unit 11 determines whether or not the right stick 24R is inclined based on an operation signal from the operation unit 15 (S101). When the right stick 24R is not inclined, the control unit 11 executes step S107 to be described later.

Meanwhile, when the right stick 24R is inclined, the control unit 11 (the direction obtaining unit 81) determines whether or not the inclination direction of the right stick 24R belongs to any of the types of the relative direction relative to the forward direction of the user character. When the inclination direction of the right stick 24R belongs to any of the types of the relative direction relative to the forward direction of the user character, the control unit 11 (the motion data selection unit 82) selects any of the feint motion data correlated to that type (S102).

Then, the control unit 11 (the user character control unit 83) starts reproduction of the feint motion data selected at step S102, to thereby cause the user character to start a feint motion (S103).

Then, the control unit 11 determines whether or not there is an opponent character positioned near the user character and watching the user character (S104). That is, the control unit 11 determines whether or not there is an opponent character that satisfies both of the above described conditions A and B (or all of the above described conditions A to C).

When it is determined that there is no such opponent character as described above, the control unit 11 executes step S107 to be described later. Meanwhile, when it is determined that there is such opponent character as described above, the control unit 11 (the determination unit 84) determines whether or not to cause the opponent character to perform the motion (the reacting motion) of reacting to the feint motion of the user character (S105). For example, the control unit 11 determines, based on predetermined probability information, whether or not to cause the opponent character to perform the reacting motion.

When it is determined not to cause the opponent character to perform the reacting motion, the control unit 11 executes step S107 to be described later. Meanwhile, when it is determined to cause the opponent character to perform the reacting motion, the control unit 11 (the opponent character control unit 85) causes the opponent character to start the reacting motion (S106).

That is, the control unit 11 starts reproduction of the motion data for the reacting motion, to thereby cause the opponent character to start the reacting motion. For example, in the case where the reacting motion is a "motion of moving that is triggered by the feint motion", the "motion data for the reacting motion" is movement motion data. Therefore, the reproduction period of the "motion data for the reacting motion" is longer, compared to that of the feint motion data.

Further, the control unit 11 determines whether or not the left stick 24L is inclined based on an operation signal from the operation unit 15 (S107). When the left stick 24L is not inclined, this processing is ended. When this processing is ended, this processing is executed again from the beginning.

Meanwhile, when the left stick 24L is inclined, the control unit 11 reproduces the movement motion data to thereby cause the user character to perform a movement motion in the direction corresponding to the inclination direction of the left stick 24L (S108).

In the above, in the case where the user character is performing the feint motion, the control unit 11 holds start of the movement motion of the user character on standby until completion of the feint motion. Then, when the feint motion is completed, the control unit 11 causes the user character to start the movement motion. With the above, explanation of this processing is finished. Note that when this processing is ended, this processing is executed again from the beginning.

According to the game device 10 according to the first embodiment described above, it is possible to cause the user character to perform a desired feint motion among a variety of feint motions through a simple operation of designating a direction. That is, it is possible to cause the user character to perform a feint motion in a desired direction through a simple operation. As described above, in the game device 10, the feint motion data is stored so as to be correlated to the type of the relative direction relative to the forward direction of the user character (see FIG. 6). Therefore, it is possible to cause the user character to perform a feint motion in a desired direction through an intuitive operation of designating a relative direction relative to the forward direction of the user character.

Note that the first invention of this application is not limited to the above described embodiment.

[1] For example, the motion data selection unit 82 may select, based on a parameter of the user character, any of the feint motion data correlated to the type to which the relative direction obtained by the direction obtaining unit 81 belongs.

In this modified example, the feint motion data is stored so as to be correlated to a combination of the type of the relative direction and the parameter of the user character. FIG. 15 shows one example of a correlation between a combination of the relative direction and the parameter of the user character and the feint motion data. In FIG. 15, "xu" indicates the value of the ability parameter or the state parameter of the user character, and "$X_T$" indicates a predetermined threshold.

In the example shown in FIG. 15, for example, the feint motion data F1 and F2 are correlated to the "forward direction". Of these, the feint motion data F1 is correlated to the parameter range "$xu \le X_T$", and the feint motion data F2 is correlated to the parameter range "$X_T < xu$".

In this case, the correlation is set such that a higher value of the ability parameter or state parameter of the user character results in a more sophisticated feint motion to be performed by the user character. That is, feint motion data for causing the user character to perform a relatively simple feint motion is set as the feint motion data F1, while feint motion data for causing the user character to perform a more sophisticated feint motion than the feint motion data F1 is set as the feint motion data F2.

The motion data selection unit 82 selects any of the feint motion data correlated to the type to which the relative direction obtained by the direction obtaining unit 81 belongs, based on the ability parameter or the state parameter of the user character and the correlation shown in FIG. 15.

Assume here a case in which the user character 44U holding the ball 42 is trying to dribble past the opponent character 46E, as shown in FIG. 8, for example, and the user inclines the right stick 24R in the direction corresponding to the forward direction F of the user character 44U (see FIG. 7). In this case, the motion data selection unit 82 selects either of the feint motion data F1 and F2 correlated to the "forward direction" based on the dribble ability parameter of the user character 44U and the correlation shown in FIG. 15.

Further, assume a case in which the user character 44U is trying to block the opponent character 46E holding the ball 42 and dribbling, as shown in FIG. 9, for example, and a user inclines the right stick 24R in the direction corresponding to the forward direction F of the user character 44U (see FIG. 7). In this case, the motion data selection unit 82 selects either of the feint motion data F1 and F2 correlated to the "forward direction" based on the defense ability parameter of the user character 44U and the information shown in FIG. 15.

In the manner described above, a feint motion in accordance with the ability of the user character among the feint motions correlated to the direction designated by the user (that is, the inclination direction of the right stick 24R) is performed. That is, it is possible to change a feint motion to be performed by the user character, depending on the ability of the user character. For example, the user character can perform a more sophisticated feint motion when the ability thereof is high.

[2] For example, the motion data selection unit 82 may select any of the feint motion data correlated to the type to which the relative direction obtained by the direction obtaining unit 81 belongs, based on the parameter of an opponent character.

In this modified example, feint motion data is stored so as to be correlated to a combination of the type of the relative direction and the parameter of the opponent character. FIG. 16 shows one example of a correlation between a combination of the relative direction and the parameter of the opponent character and the feint motion data. In FIG. 16, "xe" indicates the value of the ability parameter or the state parameter of an opponent character, and "$X_T$" indicates a predetermined threshold.

In the example shown in FIG. 16, for example, the feint motion data F1 and F2 are correlated to the "forward direction". Of these, the feint motion data F1 is correlated to the parameter range "xe≤$X_T$", and the feint motion data F2 is correlated to the parameter range "$X_T$<xe".

In this case, the correlation is set such that a lower value of the ability parameter or state parameter of the opponent character results in a more sophisticated feint motion to be performed by the user character. That is, feint motion data for causing the user character to perform a relatively simple feint motion is set as the feint motion data F2, while feint motion data for causing the user character to perform a more sophisticated feint motion than the feint motion data F2 is set as the feint motion data F1.

The motion data selection unit 82 selects any of the feint motion data correlated to the type to which the relative direction obtained by the direction obtaining unit 81 belongs, based on the ability parameter or the state parameter of the opponent character and the correlation shown in FIG. 16.

Assume a case here in which the user character 44U holding the ball 42 is trying to dribble past the opponent character 46E, as shown in FIG. 8, for example, and the user inclines the right stick 24R in the direction corresponding to the forward direction F of the user character 44U (see FIG. 7). In this case, the motion data selection unit 82 selects either of the feint motion data F1 and F2 correlated to the "forward direction" based on the defense ability parameter of the opponent character 46E and the correlation shown in FIG. 16.

Further, assume a case in which the user character 44U is trying to block the opponent character 46E holding the ball 42 and dribbling, as shown in FIG. 9, for example, and the user inclines the right stick 24R in the direction corresponding to the forward direction F of the user character 44U (see FIG. 7). In this case, the motion data selection unit 82 selects either of the feint motion data F1 and F2 correlated to the "forward direction" based on the dribble ability parameter of the opponent character 46E and the correlation shown in FIG. 16.

In the manner described above, it is possible to change a feint motion to be performed by the user character, depending on the ability of the opponent character confronting the user character. For example, when the ability of the opponent character confronting the user character is low, it is possible to cause the user character to perform a more sophisticated feint motion.

[3] For example, the motion data selection unit 82 may select any of the feint motion data correlated to the type to which the relative direction obtained by the direction obtaining unit 81 belongs, based on the current situation of the game.

[3-1] For example, in the case of the above described soccer game (that is, a game played using a moving object), the motion data selection unit 82 may select any of the feint motion data correlated to the type to which the relative direction obtained by the direction obtaining unit 81 belongs, based on the position of the ball 42 (a moving object).

[3-1-1] For example, the motion data selection unit 82 selects any of the feint motion data correlated to the type to which the relative direction obtained by the direction obtaining unit 81 belongs, based on the positional relationship between the ball 42 and the user character.

In this modified example, for example, the feint motion data is stored so as to be correlated to a combination of the type of the relative direction and the distance from the user character to the ball 42. FIG. 17 shows one example of a correlation between a combination of the relative direction and the distance from the user character to the ball 42 and the feint motion data. In FIG. 17, "du" indicates the distance from the user character to the ball 42, and "$D_T$" indicates a predetermined threshold.

In the example shown in FIG. 17, for example, the feint motion data F1 and F2 are correlated to the "forward direction". Of these, the feint motion data F1 is correlated to the distance range "du≤$D_T$" and the feint motion data F2 is correlated to the distance range "$D_T$<du".

In this case, the correlation is set such that a shorter distance from the user character to the ball 42 results in a more sophisticated feint motion to be performed. That is, feint motion data for causing the user character to perform a relatively simple feint motion is set as the feint motion data F2, while feint motion data for causing the user character to perform a more sophisticated feint motion than the feint motion data F2 is set as the feint motion data F1.

The motion data selection unit 82 selects any of the feint motion data correlated to the type to which the relative direction obtained by the direction obtaining unit 81 belongs, based on the distance from the user character to the ball 42 and the correlation shown in FIG. 17.

In the manner described above, it is possible to change a feint motion to be performed by the user character, depending on the distance from the user character to the ball 42. For example, it is possible to cause the user character to perform a more sophisticated feint motion when the distance from the user character to the ball 42 is shorter.

[3-1-2] For example, the motion data selection unit 82 may select any of the feint motion data correlated to the type to which the relative direction obtained by the direction obtaining unit 81 belongs, based on the positional relationship between the ball 42 and the opponent character.

In this modified example, for example, the feint motion data is stored so as to be correlated to a combination of the type of the relative direction and the distance from the opponent character to the ball 42. FIG. 18 shows one example of a correlation between a combination of the relative direction and the distance from the opponent character to the ball 42 and the feint motion data. In FIG. 18, "de" indicates the distance from the opponent character to the ball 42, and "$D_T$" indicates a predetermined threshold.

In the example shown in FIG. 18, the feint motion data F1 and F2 are correlated to the "forward direction". Of these, the feint motion data F1 is correlated to the distance range "de≤$D_T$", and the feint motion data F2 is correlated to the distance range "$D_T$<de".

In this case, the correlation is set such that a longer distance from the opponent character to the ball 42 results in a more sophisticated feint motion to be performed. That is, feint motion data for causing the user character to perform a relatively simple feint motion is set as the feint motion data F1, while feint motion data for causing the user character to perform a sophisticated feint motion than the feint motion data F1 is set as the feint motion data F2.

The motion data selection unit 82 selects any of the feint motion data correlated to the type to which the relative direction obtained by the direction obtaining unit 81 belongs, based on the distance from the opponent character to the ball 42 and the correlation shown in FIG. 18.

In this manner, it is possible to change a feint motion to be performed by the user character, depending on the distance from an opponent character confronting the user character to the ball 42. For example, it is possible to cause the user character to perform a more sophisticated feint motion when the distance from the opponent character to the ball 42 is longer.

[3-2] For example, the motion data selection unit 82 may select any of the feint motion data correlated to the type to which the relative direction obtained by the direction obtaining unit 81 belongs, based on the positional relationship between the user character and the opponent character.

For example, in this modified example, the feint motion data is stored so as to be correlated to a combination of the type of the relative direction and the distance from the user character to the opponent character. FIG. 19 shows one example of a correlation between a combination of the relative direction and the distance from the user character to the opponent character and the feint motion data. In FIG. 19, "due" indicates the distance from the user character to the opponent character, and "$D_T$" indicates a predetermined threshold.

In the example shown in FIG. 19, the feint motion data F1 and F2 are correlated to the "forward direction". Of these, the feint motion data F1 is correlated to the distance range "due≤$D_T$", and the feint motion data F2 is correlated to the distance range "$D_T$<due".

In this case, the correlation is set such that a longer distance from the user character to the opponent character results in a more sophisticated feint motion to be performed. That is, feint motion data for causing the user character to perform a relatively simple feint motion is set as the feint motion data F1, while feint motion data for causing the user character to perform a more sophisticated feint motion than the feint motion data F1 is set as the feint motion data F2.

The motion data selection unit 82 selects any of the feint motion data correlated to the type to which the relative direction obtained by the direction obtaining unit 81 belongs, based on the distance from the user character to the opponent character and the correlation shown in FIG. 19.

In this manner, it is possible to change a feint motion to be performed by the user character, depending on the distance from the user character to the opponent character. For example, it is possible to cause the user character to perform a more sophisticated feint motion when the distance from the user character to the opponent character is longer.

[4] In the above described embodiment, for example, the determination unit 84 determines whether or not to cause the opponent character to perform the reacting motion based on the probability information. The determination unit 84 may change the above described probability information.

[4-1] Initially, a first example will be described. For example, the determination unit 84 sets the above described probability information based on the ability parameter or the state parameter of the user character.

In this case, the game data storage unit 80 stores information for setting the above described probability information based on the ability parameter or the state parameter of the user character.

FIG. 20 shows one example of this information. The information shown in FIG. 20 is information defining a correlation between the parameter of the user character and the above described probability information. Note that information in an expression format may be stored, instead of the information in a table format such as is shown in FIG. 20.

In FIG. 20, "xu" indicates the value of the ability parameter or the state parameter of the user character, and "$X_T$" indicates a predetermined threshold. Further, "Pa" and "Pb" indicate predetermined values indicating respective probabilities of determining to cause the opponent character to perform the reacting motion, in which "Pb" indicates a higher probability than "Pa". Therefore, the information shown in FIG. 20 is set such that a higher value of the ability parameter or the state parameter of the user character results in a higher probability of determining to cause the opponent character to perform the reacting motion.

The determination unit 84 sets the above described probability information based on the ability parameter or the state parameter of the user character and the information shown in FIG. 20.

As shown in FIG. 8, for example, when the user character 44U holding the ball 42 is trying to dribble past the opponent character 46E, the determination unit 84 sets the above described probability information based on the dribble ability parameter of the user character 44U and the information shown in FIG. 20. In this manner, it is possible to set a high probability of determining to cause the opponent character 46E to perform the motion (the reacting motion) of reacting to the feint motion of the user character 44U when the dribble ability of the user character 44U is high.

Further, as shown in FIG. 9, for example, when the user character 44U is trying to block the opponent character 46E holding the ball 42 and dribbling, the determination unit 84 sets the above described probability information based on the defense ability parameter of the user character 44U and the information shown in FIG. 20. In this manner, it is possible to set a high probability of determining to cause the opponent character 46E to perform the motion (the reacting motion) of reacting to the feint motion of the user character 44U when the defense ability of the user character 44U is high.

[4-2] A second example will be described. For example, the determination unit 84 sets the above described probability information based on the ability parameter or the state parameter of the opponent character.

In this case, the game data storage unit 80 stores information for setting the above described probability information based on the ability parameter or the state parameter of the opponent character. FIG. 21 shows one example of this information. The information shown in FIG. 21 is information defining a correlation between the parameter of the opponent character and the above described probability information. Note that information in an expression format may be stored, instead of the information in a table format such as is shown in FIG. 21.

In FIG. 21, "xe" indicates the value of the ability parameter or the state parameter of the opponent character, and "$X_T$" indicates a predetermined threshold. Further, "Pc" and "Pd" indicate predetermined values indicating respective probabilities of determining to cause the opponent character to perform the reacting motion, in which "Pc" indicates a higher probability than "Pd". Therefore, the information shown in FIG. 21 is set such that a lower value of the ability parameter or the state parameter of the opponent character results in a higher probability of determining to cause the opponent character to perform the reacting motion.

The determination unit 84 sets the above described probability information based on the ability parameter or the state parameter of the opponent character and the information shown in FIG. 21.

As shown in FIG. 8, for example, when the user character 44U holding the ball 42 is trying to dribble past the opponent character 46E, the determination unit 84 sets the above described probability information based on the defense ability parameter of the opponent character 46E and the information shown in FIG. 21. In this manner, it is possible to set a high probability of determining to cause the opponent character 46E to perform the motion (the reacting motion) of reacting to the feint motion of the user character 44U when the defense ability of the opponent character 46E is low.

Further, as shown in FIG. 9, for example, when the user character 44U is trying to block the opponent character 46E holding the ball 42 and dribbling, the determination unit 84 sets the above described probability information based on the dribble ability parameter of the opponent character 46E and the information shown in FIG. 21. In this manner, it is possible to set a high probability of determining to cause the opponent character 46E to perform the motion (the reacting motion) of reacting to the feint motion of the user character 44U when the dribble ability of the opponent character 46E is low.

[4-3] A third example will be described. For example, when the user character performs a feint motion (that is, when the first direction designating operation for causing the user character to perform a feint motion is performed), the determination unit 84 sets the above described probability information based on the current situation of the game. In this case, as a result of determination of the above described probability information based on the current situation of the game, whether or not to cause the opponent character to perform the reacting motion is determined based on the current situation of the game.

[4-3-1] For example, the determination unit 84 sets the probability information based on the movement speed of the user character.

In this case, the game data storage unit 80 stores information for setting the above described probability information based on the movement speed of the user character. FIG. 22 shows one example of this information. The information shown in FIG. 22 is information defining a correlation between the movement speed of the user character and the above described probability information. Note that information in an expression format may be stored, instead of the information in a table format such as is shown in FIG. 22.

In FIG. 22, "vu" indicates the movement speed of the user character, and "$V_T$" indicates a predetermined threshold. "Pe" and "Pf" indicate predetermined values indicating respective probabilities of determining to cause the opponent character to perform the reacting motion, in which "Pf" indicates a higher probability than "Pe". Therefore, the information shown in FIG. 22 is set such that a faster movement speed of the user character results in a higher probability of determining to cause the opponent character to perform the motion (the reacting motion) of reacting to the feint motion of the user character.

The determination unit 84 sets the above described probability information, based on the movement speed of the user character when the first direction designating operation for causing the user character to perform a feint motion is performed (or when the user character performs a feint motion) and the information shown in FIG. 22. In this manner, it is possible to set a high probability of determining to cause the opponent character to perform the motion (the reacting motion) of reacting to the feint motion of the user character when the movement speed of the user character is fast.

[4-3-2] For example, the determination unit 84 sets the above described probability information based on the movement speed of the opponent character.

In this case, the game data storage unit 80 stores information for setting the above described probability information based on the movement speed of the opponent character. FIG. 23 shows one example of this information. The information shown in FIG. 23 is information defining a correlation between the movement speed of the opponent character and the above described probability information. Note that information in an expression format may be stored, instead of the information in a table format such as is shown in FIG. 23.

In FIG. 23, "ve" indicates the movement speed of the opponent character, and "$V_T$" indicates a predetermined threshold. Further, "Pg" and "Ph" indicate predetermined values indicating respective probabilities of determining to cause the opponent character to perform the reacting motion, wherein "Pg" indicates a higher probability than "Ph". Therefore, the information shown in FIG. 23 is set such that a slower movement speed of the opponent character results in a higher probability of determining to cause the opponent character to perform the motion (the reacting motion) of reacting to the feint motion of the user character.

The determination unit 84 sets the above described probability information, based on the movement speed of the opponent character when the first direction designating operation for causing the user character to perform a feint motion is performed (or when the user character performs a feint motion) and the information shown in FIG. 23. In this manner, it is possible to set a high probability of determining to cause the opponent character to perform the motion (the reacting motion) of reacting to the feint motion of the user character when the movement speed of the opponent character is slow.

[4-3-3] For example, the determination unit 84 may set the above described probability information based on both of the movement speed of the user character and that of the opponent character.

In this case, the game data storage unit 80 stores information for setting the probability information based on both of the movement speed of the user character and that of the opponent character. For example, information, such as a combination of the information shown in FIG. 22 and that in FIG. 23, is stored in the game data storage unit 80. The determination unit 84 sets the above described probability information based on both of the movement speed of the user character and that of the opponent character and the information.

Note that, alternatively, the determination unit 84 may set the above described probability information based on the relative movement speed of the user character relative to that of the opponent character.

In this case, the game data storage unit 80 stores information for setting the above described probability information based on the relative movement speed of the user character. For example, information similar to that shown in FIG. 22 is stored in the game data storage unit 80. The determination unit 84 sets the above described probability information based on the relative movement speed of the user character and the information.

[4-3-4] For example, the determination unit 84 sets the above described probability information based on the position of at least one of the user character and the opponent character.

[4-3-4-1] For example, the determination unit 84 sets the above described probability information based on the distance between the user character and the ball 42 (a moving object).

In this case, the game data storage unit 80 stores information for setting the above described probability information based on the above described distance. FIG. 24 shows one example of this information. The information shown in FIG. 24 is information defining a correlation between the above described distance and the above described probability information. Note that information in an expression format may be stored, instead of the information in a table format such as is shown in FIG. 24.

In FIG. 24, "du" indicates the distance from the user character to the ball 42, and "$D_T$" indicates a predetermined threshold. "Pi" and "Pj" indicate predetermined values indicating respective probabilities of causing the opponent character to perform the reacting motion, in which "Pi" indicates a higher probability than "Pj". Therefore, the information shown in FIG. 24 is set such that a shorter distance between the user character and the ball 42 results in a higher probability of determining to cause the opponent character to perform the motion (the reacting motion) of reacting to the feint motion of the user character.

The determination unit 84 sets the above described probability information, based on the distance from the user character to the ball 42 when the first direction designating operation for causing the user character to perform a feint motion is performed (or when the user character performs a feint motion), and the information shown in FIG. 24. In this manner, it is possible to set a high possibility of determining to cause the opponent character to perform the motion (the reacting motion) of reacting to the feint motion of the user character when the distance from the user character to the ball 42 is short.

[4-3-4-2] For example, the determination unit 84 sets the above described probability information based on the distance between the opponent character and the ball 42 (a moving object).

In this case, the game data storage unit 80 stores information for setting the above described probability information based on the above described distance. FIG. 25 shows one example of this information. The information shown in FIG. 25 is information defining a correlation between the above described distance and the above described probability information. Note that information in an expression format may be stored, instead of the information in a table format such as is shown in FIG. 25.

In FIG. 25, "de" indicates the distance from the opponent character to the ball 42, and "$D_T$" indicates a predetermined threshold. "Pk" and "Pl" indicate predetermined values indicating respective probabilities of determining to cause the opponent character to perform the reacting motion, in which "Pl" indicates a higher probability than "Pk". Therefore, the information shown in FIG. 25 is set such that a higher probability of determining to cause the opponent character to perform the motion (the reacting motion) of reacting to the feint motion of the user character is set when the distance between the opponent character and the ball 42 is longer.

The determination unit 84 sets the above described probability information, based on the distance from the opponent character to the ball 42 when the first direction designating operation for causing the user character to perform a feint motion is performed (or when the user character performs a feint motion), and the information shown in FIG. 25. In this manner, it is possible to set a high probability of determining to cause the opponent character to perform the motion (the reacting motion) of reacting to the feint motion of the user character when the distance from the opponent character to the ball 42 is long.

[4-3-4-3] For example, the determination unit 84 sets the above described probability information based on the distance between the user character and the opponent character.

In this case, the game data storage unit 80 stores information for setting the above described probability information based on the distance between the user character and the opponent character. This information is similar to, for example, information for setting the above described probability information based on the distance between the user character and the ball (for example, FIG. 24) or information for setting the above described probability information based on the distance between the opponent character and the ball (for example FIG. 25). In this case, a high probability of determining to cause the opponent character to perform the motion (the reacting motion) of reacting to the feint motion of the user character is set when the distance from the user character to the opponent character is long. Then, the determination unit 84 sets the above described probability information based on the distance between the user character and the opponent character and the information.

In this manner, it is possible to set a high probability of determining to cause the opponent character to perform the motion (the reacting motion) of reacting to the feint motion of the user character when the distance from the user character to the opponent character is long.

[5] For example, in causing the user character to perform the feint motion, the user character control unit 83 may change the reproduction speed of the feint motion data.

[5-1] For example, the user character control unit 83 sets the above described reproduction speed based on the ability parameter or the state parameter of the user character.

In this case, the game data storage unit 80 stores information for setting the above described reproduction speed based on the ability parameter or the state parameter of the user character. FIG. 26 shows one example of this information. The information shown in FIG. 26 is information defining a correlation between the parameter of the user character and the above described reproduction speed. Note that information in an expression format may be stored, instead of the information in a table format such as is shown in FIG. 26.

In FIG. 26, "xu" indicates the value of the ability parameter or the state parameter of the user character, and "$X_T$" indicates a predetermined threshold. "Va" and "Vb" indicate predetermined values indicating respective reproduction speeds, in which "Vb" indicates a faster reproduction speed than "Va". Therefore, the information shown in FIG. 26 is set such that a higher value of the ability parameter or the state parameter of the user character results in a faster reproduction speed of the feint motion data when the user character performs the feint motion.

The user character control unit 83 sets the above described reproduction speed based on the ability parameter or the state parameter of the user character and the information shown in FIG. 26.

As shown in FIG. 8, for example, when the user character 44U holding the ball 42 is trying to dribble past the opponent character 46E, the user character control unit 83 sets the above described reproduction speed based on the dribble ability parameter of the user character 44U and the information shown in FIG. 26.

In this manner, it is possible to set a fast reproduction speed of the feint motion data when the dribble ability of the user character 44U is high. In this case, as the reproduction speed of the feint motion data is faster, the feint motion (the feint motion in the first direction 60) is completed earlier, and therefore, the user character 44U can start the next motion (the movement motion in the third direction 64) earlier. As a result, the user character 44U can more readily dribble past the opponent character 46E.

Further, as shown in FIG. 9, for example, when the user character 44U is trying to block the opponent character 46E holding the ball 42 and dribbling, the user character control unit 83 sets the above described reproduction speed based on the defense ability parameter of the user character 44U and the information shown in FIG. 26.

In this manner, it is possible to set a fast reproduction speed of the feint motion data when the defense ability of the user character 44U is high. In this case, as the reproduction speed of the feint motion data is faster, the feint motion (the feint motion in the first direction 70) is completed earlier, and therefore, the user character 44U can start the next motion (the movement motion in the third direction 74) earlier. As a result, the user character 44U can more readily block the opponent character 46E dribbling.

[5-2] Further, for example, the user character control unit 83 sets the above described reproduction speed based on the ability parameter or the state parameter of the opponent character.

In this case, the game data storage unit 80 stores information for setting the above described reproduction speed based on the ability parameter or the state parameter of the opponent character. FIG. 27 shows one example of this information. The information shown in FIG. 27 is information defining a correlation between the parameter of the opponent character and the above described reproduction speed. Note that information in an expression format may be stored, instead of the information in a table format such as is shown in FIG. 27.

In FIG. 27, "xe" indicates the value of the ability parameter or the state parameter of an opponent character, and "$X_T$" indicates a predetermined threshold. "Vc" and "Vd" indicate predetermined values indicating respective reproduction speeds, in which "Vc" indicates a faster reproduction speed than "Vd". Therefore, the information shown in FIG. 27 is set such that a lower value of the ability parameter or the state parameter of the opponent character results in a faster reproduction speed of the feint motion data when the user character performs the feint motion.

The user character control unit 83 sets the above described reproduction speed based on the ability parameter or the state parameter of the opponent character and the information shown in FIG. 27.

As shown in FIG. 8, for example, when the user character 44U holding the ball 42 is trying to dribble past the opponent character 46E, the user character control unit 83 sets the above described reproduction speed based on the defense ability parameter of the opponent character 46E and the information shown in FIG. 27.

In this manner, it is possible to set a fast reproduction speed of the feint motion data when the defense ability of the opponent character 46E is low. In this case, as the reproduction speed of the feint motion data is faster, the feint motion (the feint motion in the first direction 60) is completed earlier, and therefore, the user character 44U can start the next motion (the movement motion in the third direction 64) earlier. As a result, the user character 44U can more readily dribble past the opponent character 46E.

Further, as shown in FIG. 9, for example, when the user character 44U is trying to block the opponent character 46E holding the ball 42 and dribbling, the user character control unit 83 sets the above described reproduction speed based on the dribble ability parameter of the opponent character 46E and the information shown in FIG. 27.

In this manner, it is possible to set a fast reproduction speed of the feint motion data when the dribble ability of the opponent character 46E is low. In this case, as the reproduction speed of the feint motion data is faster, the feint motion (the feint motion in the first direction 70) is completed earlier, and therefore, the user character 44U can start the next motion (the movement motion in the third direction 74) earlier. As a result, the user character 44U can more readily block the opponent character 46E dribbling.

[6] For example, the determination unit 84 and the opponent character control unit 85 are not indispensable structural elements and may be omitted. That is, the opponent character may not perform the reacting motion. Alternatively, only the determination unit 84 may be omitted. That is, when the user character performs the feint motion, the opponent character control unit 85 may always cause the opponent character to perform the reacting motion.

Figure 28:
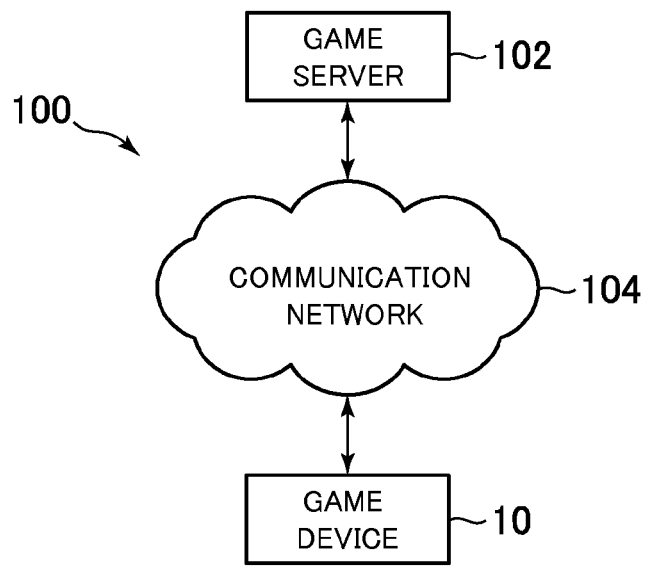
FIG. 28 shows one example of an overall structure of a game system.

[7] For example, the first invention of this application can be applied to a game system. For example, the first invention of this application can be applied to a game system 100 such as is shown in FIG. 28. The game system 100 shown in FIG. 28 includes the game device 10 and a game server 102. The game server 102 is, for example, a server computer including a control unit or the like.

In the game system 100, the game device 10 and the game server 102 exchange data via a communication network 104 to execute the game.

For example, in the game system 100, game situation data or the like is stored in a storage unit provided in the game server 102 or a storage unit provided in a device accessible from the game server 102.

Further, in the game system 100, data on an operation performed in the game device 10 is sent from the game device 10 to the game server 102. In the game server 102, the game situation data is updated based on the data sent from the game device 10. Then, data indicating the updated content of the game situation data is sent from the game server 102 to the game device 10. In the game device 10, the game screen 50 is displayed on the display unit 16 based on the data sent from the game server 102.

Alternatively, in the game system 100, when the game situation data is updated in the game server 102, the game server 102 may generate a game screen 50 based on the updated current situation data, and data indicating the generated game screen 50 may be sent from the game server 102 to the game device 10.

In this case, processing at the respective steps shown in FIG. 14 is executed in the game server 102, and the respective functional blocks shown in FIG. 10 are implemented by the control unit of the game server 102 (a game control device).

Alternatively, implication of the functional blocks shown in FIG. 10 may be shared by the game server 102 and the game device 10. That is, some of the functional blocks shown in FIG. 10 may be implemented in the game server 102, while the other in the game device 10.

[8] Although the game space 30 is a virtual 3D space in the above described embodiment, the game space may be a virtual 2D space. That is, the position or the like of a character may be defined by two coordinates.

[9] In the above, a case is described in which the first invention of this application is applied to a soccer game. However, the first invention of this application can be applied to a game other than a soccer game. For example, the first invention of this application can be applied to a game that is played using a moving object. That is, the first invention of this application can be applied to a sport game that emulates a sport that is played using a moving object. Further, for example, the first invention of this application can be applied to a game other than a sport game. The first invention of this application can be applied to a game in which a user character acts according to an operation by a user.

Further, in the above, a case is described in which the user character is caused to perform a desired feint motion among a plurality of kinds of feint motions. However, the first invention of this application can be applied to a case in which the user character is caused to perform a motion other than a feint motion. As the first invention of this application can applied to a game other than a soccer game, as described above, the first invention of this application can be applied to a case in which the user character is caused to perform a motion that is not performed in a soccer game.

Summary of First Invention of Application

According to the above description, the first invention of this application can be understood as follows, for example. Note that in the description below, although the reference numerals shown in the drawings are included with parenthesis to help understanding of the first invention of this application, the first invention of this application is not thereby limited to the aspect shown.

A game control device according to the first invention of this application is a game control device (10 or 102) for executing a game in which a user character acts according to an operation by a user, the game control device including: direction obtaining means (81) for, in a case where a direction designating operation is performed by the user, obtaining a relative direction of a direction designated through the direction designating operation relative to a forward direction of the user character; motion data selection means (82) for selecting any of motion data correlated to a type to which the relative direction obtained by the direction obtaining means (81) belongs from among motion data stored in means (80) for storing the type of the relative direction relative to the forward direction of the user character and a plurality of kinds of motion data so as to be correlated to each other; and user character control means (83) for causing the user character to perform a motion in accordance with the motion data selected by the motion data selection means (82).

A game system according to the first invention of this application is a game system (100) for executing a game in which a user character acts according to an operation by a user, the game system including: direction obtaining means (81) for, in a case where a direction designating operation is performed by the user, obtaining a relative direction of a direction designated through the direction designating operation relative to a forward direction of the user character; motion data selection means (82) for selecting any of motion data correlated to a type to which the relative direction obtained by the direction obtaining means (81) belongs from among motion data stored in means (80) for storing the type of the relative direction relative to the forward direction of the user character and a plurality of kinds of motion data so as to be correlated to each other; and user character control means (83) for causing the user character to perform a motion in accordance with the motion data selected by the motion data selection means (82).

A game control method according to the first invention of this application is a game control method for executing a game in which a user character acts according to an operation by a user, the game control method including: obtaining, in a case where a direction designating operation is performed by the user, a relative direction of a direction designated through the direction designating operation relative to a forward direction of the user character; selecting any of motion data correlated to a type to which the obtained relative direction belongs from among motion data stored in a storage (80) that stores the type of the relative direction relative to the forward direction of the user character and a plurality of kinds of motion data so as to be correlated to each other; and causing the user character to perform a motion in accordance with the selected motion data.

A program according to the first invention of this application is a program for causing a computer to function as a game device for executing a game in which a user character acts according to an operation by a user, the program for causing the computer to: obtain, in a case where a direction designating operation is performed by the user, a relative direction of a direction designated through the direction designating operation relative to a forward direction of the user character; select any of motion data correlated to a type to which the obtained relative direction belongs from among motion data stored in a storage (80) that stores the type of the relative direction relative to the forward direction of the user character and a plurality of kinds of motion data so as to be correlated to each other; and cause the user character to perform a motion in accordance with the selected motion data.

An information storage medium according to the first invention of this application is a non-transitory computer-readable information storage medium storing the above described program.

In one aspect of the first invention of this application, the game control device may include means (82) for obtaining a parameter of the user character stored in means (80) for storing the parameter relating to at least one of an ability and a state of the user character. The motion data selection means (82) may include means for selecting any of the motion data correlated to the type to which the relative direction obtained by the direction obtaining means (81) belongs, based on the parameter of the user character.

In one aspect of the first invention of this application, the game control device may include means (82) for obtaining a parameter of an opponent character stored in means (80) for storing the parameter relating to at least one of an ability and a state of the opponent character, the opponent character being a game character opposing the user character. The motion data selection means (82) may include means for selecting any of the motion data correlated to the type to which the relative direction obtained by the direction obtaining means (81) belongs, based on the parameter of the opponent character.

In one aspect of the first invention of this application, the motion data selection means (82) may include means for selecting any of the motion data correlated to the type to which the relative direction obtained by the direction obtaining means (81) belongs, based on a current situation of the game.

In one aspect of the first invention of this application, the game may be a game played using a moving object, and the motion data selection means (82) may include means for selecting any of the motion data correlated to the type to which the relative direction obtained by the direction obtaining means (81) belongs, based on a position of the moving object.

In one aspect of the first invention of this application, the motion data selection means (82) may include means for selecting any of the motion data correlated to the type to which the relative direction obtained by the direction obtaining means (81) belongs, based on a positional relationship between the moving object and the user character.

In one aspect of the first invention of this application, the motion data selection means (82) may include means for selecting any of the motion data correlated to the type to which the relative direction obtained by the direction obtaining means (81) belongs, based on a positional relationship between the moving object and an opponent character that is a game character opposing the user character.

In one aspect of the first invention of this application, the motion data selection means (82) may include means for selecting any of the motion data correlated to the type to which the relative direction obtained by the direction obtaining means (81) belongs, based on a positional relationship between the user character and an opponent character that is a game character opposing the user character.

In one aspect of the first invention of this application, the game control device may include means (83) for obtaining a parameter of the user character stored in means (80) for storing the parameter relating to at least one of an ability and a state of the user character. The user character control means (83) may cause the user character to perform the motion by reproducing the motion data selected by the motion data selection means (82). The user character control means (83) may include means for setting a reproduction speed of the motion data selected by the motion data selection means (82), based on the parameter of the user character.

In one aspect of the first invention of this application, the game control device may include means (83) for obtaining a parameter of an opponent character stored in means (80) for storing the parameter relating to at least one of an ability and a state of the opponent character, the opponent character being a game character opposing the user character. The user character control means (83) may cause the user character to perform the motion by reproducing the motion data selected by the motion data selection means (82). The user character control means (83) may include means for setting a reproduction speed of the motion data selected by the motion data selection means (82), based on the parameter of the opponent character.

In one aspect of the first invention of this application, the game control device may include: determination means (84) for determining, in a case where the user character performs the motion, whether or not to cause an opponent character to perform a reacting motion that is a motion of reacting to the motion of the user character, based on predetermined information, the opponent character being a game character opposing the user character, and opponent character control means (85) for causing the opponent character to perform the reacting motion, according to a result of determination by the determination means (84).

In one aspect of the first invention of this application, the game control device may include at least one of: means (84) for obtaining a parameter of the user character stored in means (80) for storing the parameter relating to at least one of an ability and a state of the user character and means (84) for obtaining a parameter of the opponent character stored in means (80) for storing the parameter relating to at least one of an ability and a state of the opponent character. The determination means (84) may determine whether or not to cause the opponent character to perform the reacting motion, based on at least one of the parameter of the user character and the parameter of the opponent character.

In one aspect of the first invention of this application, the determination means (84) may include means for determining whether or not to cause the opponent character to perform the reacting motion, based on a result of comparison between the parameter of the user character and the parameter of the opponent character.

In one aspect of the first invention of this application, the determination means (84) may include means for determining whether or not to cause the opponent character to perform the reacting motion, based on a current situation of the game.

In one aspect of the first invention of this application, the determination means (84) may include means for determining whether or not to cause the opponent character to perform the reacting motion, based on a movement speed of at least one of the user character and the opponent character.

In one aspect of the first invention of this application, the determination means (84) may include means for determining whether or not to cause the opponent character to perform the reacting motion, based on a position of at least one of the user character and the opponent character.

In one aspect of the first invention of this application, the game control device may include means (83), in a case where a second direction designating operation is performed, for causing the user character to perform a movement motion of moving in a direction designated through the second direction designating operation. The direction obtaining means (81), in a case where the user performs a first direction designating operation, may obtain a relative direction of a direction designated through the first direction designating operation relative to the forward direction of the user character. The motion data selection means (82) may select any of motion data correlated to a type to which the relative direction obtained by the direction obtaining means (81) belongs from among motion data stored in means (80) for storing a type of a relative direction relative to the forward direction of the user character and a plurality of kinds of motion data relating to a motion different from the movement motion so as to be correlated to each other. The user character control means (83) may include means for causing the user character to perform a motion in accordance with the motion data selected by the motion data selection means (82).

In one aspect of the first invention of this application, the motion data selection means (82) may select any of feint motion data correlated to the type to which the relative direction obtained by the direction obtaining means (81) belongs from among feint motion data stored in means (80) for storing the type of the relative direction relative to the forward direction of the user character and a plurality of kinds of feint motion data so as to be correlated to each other. The user character control means (83) may include means for causing the user character to perform a feint motion in accordance with the feint motion data selected by the motion data selection means (82).

While there have been described what are at present considered to be certain embodiments of the invention, it will be understood that various modifications may be made thereto, and it is intended that the appended claims cover all such modifications as fall within the true spirit and scope of the invention.

In the following, an example of an embodiment of a second invention in this application is described in detail based on the drawings.

A hardware structure of a game device (a game control device) according to an embodiment of the second invention in this application (hereinafter referred to as a "second embodiment") is similar to that in the first embodiment (see FIGS. 1, 2A, 2B).

In the game device 10 according to the second embodiment also, a game program is executed, whereby a game is executed. For example, a game in which a game character acts according to an operation by a user is executed. In the following, a sport game that emulates a sport that is played using a moving object will be described as an example of the game executed in the game device 10. In other words, a sport game that emulates a sport that aims to move a moving object into a predetermined target area will be described. Specifically, a soccer game will be described.

Note that, for example, the soccer game is basically similar to that which is described in the first embodiment. For example, the game space and the game screen are similar to those in the first embodiment (see FIGS. 3 and 4), and a correlation between a motion performed by the user character and an operation performed by the user is similar to that in the first embodiment (see FIG. 5).

In the game device 10 according to the second embodiment, it is possible to cause the user character to perform a feint motion in a direction desired by the user. In the following, this function will be described.

Similar to the first embodiment, the "feint motion" is, for example, a feint motion (dummy motion) relating to a movement motion of the user character and a motion of the user character faking to move in a direction designated by the user. In other words, the "feint motion" is a movement motion of the user character that suddenly stops halfway. Once the user character stops moving halfway, the user character no longer moves. Note that when the user character holds the ball 42, the "feint motion" may be a motion of the user character faking to pass the ball 40 in a direction designated by the user. In the following, a case will be described in which the "feint motion" is a motion of the user character faking to move in a direction designated by the user.

When the user inclines the right stick 24R, the user character performs a feint motion in the direction corresponding to the inclination direction of the right stick 24R. That is, the user character pretends to move in the direction corresponding to the inclination direction of the right stick 24R. That is, the user inclines the right stick 24R to thereby designate a direction of the feint motion which the user character should perform. Note that an absolute direction in the game space 30 may be designated as the direction of the feint motion, or a direction relative to the forward direction of the user character may be designated as the direction of the feint motion. In the former case, a correlation between the direction of the feint motion of the user character performed in response to the right stick 24R inclined in one direction (for example, the rightward direction) and the forward direction of the user character is not constant, and the correlation changes depending on in which direction in the game space 30 the forward direction of the user character is directed.

A feint motion is performed when the user character holds the ball 42. Moreover, a feint motion is also performed when the user character does not hold the ball 42. For example, a feint motion is performed also when the user character is defending against an opponent character holding the ball 42.

An example of the feint motion performed by the user character when the user character holds the ball 42 will be described referring to FIG. 8. As described above, the reference letter "F" in FIG. 8 indicates the respective forward direction (the respective frontward direction) of the user character 44U and of the opponent character 46E. FIG. 8 shows a situation in which the user character 44U holding the ball 42 is facing the opponent character 46E, and trying to dribble past the opponent character 46E. Dribbling past the opponent character 46E refers to moving behind the opponent character 46E together with the ball 42 while trying not to be deprived of the ball 42 by the opponent character 46E.

In this case, for example, the user inclines the right stick 24R in the direction corresponding to the rightward direction R of the user character 44U (see FIG. 7). With this operation, the user character 44U performs a feint motion in a first direction 60 (the right forward direction of the user character 44U). That is, the user character 44U moves the upper part of the user character 44U body as if moving in the first direction 60 to thereby pretend to move in the first direction 60.

When the opponent character 46E is misled by the feint motion of the user character 44U, the opponent character 46E moves in a second direction 62 that is a direction against the first direction 60, in order to block the user character 44U dribbling in the first direction 60.

In this case, the user inclines the left stick 24L in the direction corresponding to a third direction 64 that is a direction opposite to the movement direction (the second direction 62) of the opponent character 46E, in order to dribble past the opponent character 46E. With this operation, the user character 44U moves in the third direction 64 to dribble past the opponent character 46E having moved in the second direction 62.

An example of the feint motion performed by the user character when the user character is defending against the opponent character holding the ball 42 will be described referring to FIG. 9. As described above, the reference letter "F" in FIG. 9 indicates the respective forward direction (the respective frontward direction) of the user character 44U and of the opponent character 46E. FIG. 9 shows a situation in which the user character 44U is facing the opponent character 46E holding the ball 42 and defending against the opponent character 46E.

In this case, for example, the user inclines the right stick 24R in the direction corresponding to the first direction 70. With this operation, the user character 44U performs a feint motion in the first direction 70. That is, the user character 44U moves the upper part of the user character 44U body as if moving in the first direction 70 to thereby pretend to move in the first direction 70.

When the opponent character 46E is misled by the feint motion of the user character 44U, the opponent character 46E dribbles in a second direction 72 that is a direction opposite to the first direction 70, in order to dribble in the direction opposite to the direction (the first direction 70) in which the user character 44U moves.

In this case, the user inclines the left stick 24L in the direction corresponding to a third direction 74 that is a direction against the direction (the second direction 72) in which the opponent character 46E is dribbling, in order to block the opponent character 46E dribbling. With this operation, the user character 44U moves toward the opponent character 46E and deprives the opponent character 46E of the ball 42.

Figure 29:
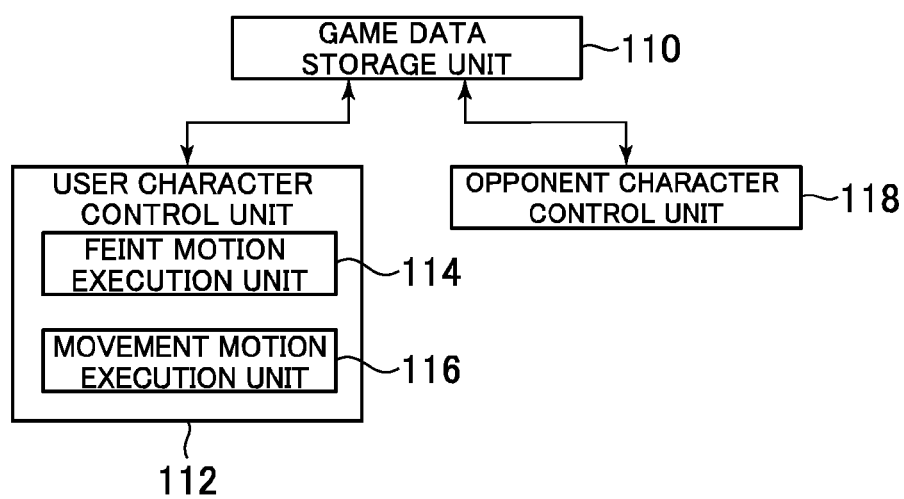
FIG. 29 is a functional block diagram showing one example of functional blocks implemented in a game device according to a second embodiment.

In the following, a structure for causing the user character to perform a feint motion in a direction desired by the user will be described. FIG. 29 is a functional block diagram showing one example of a functional block that is implemented in the game device 10 according to the second embodiment. As shown in FIG. 29, the game device 10 according to the second embodiment includes a game data storage unit 110, a user character control unit 112, and an opponent character control unit 118.

For example, the game data storage unit 110 is implemented using at least one of the storage unit 12 and an optical disk. Alternatively, the game data storage unit 110 may be implemented using a storage unit included in another device accessible from the game device 10. That is, all or some of the data stored in the game data storage unit 110 may be stored in a storage unit included in another device accessible from the game device 10.

For example, the user character control unit 112 and the opponent character control unit 118 are implemented by the control unit 11. That is, the control unit 11 executes processing according to a program, thereby functioning as the user character control unit 112 and the opponent character control unit 118.

In the game data storage unit 110, data that is necessary to execute the game is stored. For example, model data (shape data) of an object placed in the game space 30 is stored in the game data storage unit 110.

Further, for example, motion data of the game character 44 (46) is stored in the game data storage unit 110. Motion data is data that defines a change in the posture of the game character (46) performing a motion. In other words, the motion data indicates a posture in every frame (for example, $\frac{1}{30}^{th}$ or $\frac{1}{60}^{th}$ of a second), of the game character 44 (46) performing a motion. Note that changing the posture of the game character 44 (46) based on the motion data to thereby cause the game character 44 (46) to perform a motion is described as "reproducing the motion data".

In the game data storage unit 110, for example, movement motion data for causing the game character 44 (46) to perform a movement motion and feint motion data for causing the game character (46) to perform a feint motion are stored.

The reproduction period of the feint motion data is shorter, compared to that of the movement motion data. The "reproduction period" means a period of time necessary to reproduce the motion data from the head to end thereof. In other words, the "reproduction period" means the number of frames of the motion data.

As the reproduction period of the feint motion data is shorter, compared to that of the movement motion data, in the example shown in FIG. 8, for example, the feint motion of the user character 44U in the first direction 60 (that is, reproduction of the feint motion data) is completed earlier than the movement motion of the opponent character 46E in the second direction 62 (that is, reproduction of the movement motion data). Therefore, the user character 44U can move in the third direction 64 before completion of the movement motion of the opponent character 46E in the second direction 62. As a result, the user character 44U can dribble past the opponent character 46E.

Similarly, in the example shown in FIG. 9, the feint motion of the user character 44U in the first direction 70 (that is, reproduction of the feint motion data) is completed earlier than the movement motion of the opponent character 46E in the second direction 72 (that is, reproduction of the movement motion data). Therefore, the user character 44U can move in the third direction 74 before completion of the movement motion of the opponent character 46E in the second direction 72. As a result, the user character 44U can block the opponent character 46E dribbling.

Note that, for example, the feint motion data includes a portion identical or substantially identical to a portion of a predetermined length from the top of the movement motion data. For example, the movement motion data includes a first portion concerning a period from a moment with a game character 44 (46) in a still state to a moment at which the game character 44 (46) starts a movement motion, and a second portion concerning a period after start of the movement motion by the game character 44 (46) (that is, a portion in which the game character 44 (46) is performing the movement motion).

The feint motion data includes a portion identical or substantially identical to the first portion. That is, in the first portion of the movement motion data, the game character 44 (46) moves mainly the upper part of the game character 44 (46) in order to start the movement motion, while in the feint motion data, the game character 44 (46) moves mainly the upper part of the game character 44 (46) as if starting the movement motion.

Note that as the feint motion data is data indicating a feint motion of faking to start the movement motion by moving the upper part of the game character 44 (46), a motion range of the lower part of the game character 44 (46) is set smaller, compared to that of the upper part of the game character 44 (46).

Note that the "motion range of the lower part is set smaller, compared to that of the upper part" means that, for example, a motion range of a representative point of the lower part is smaller than that of the upper part. For example, the "representative point of the lower part" refers to a point with the largest motion range in the lower part, and the "representative point of the upper part" refers to a point with the largest motion range in the upper part.

The "motion range of the lower part is set smaller, compared to that of the upper part" can be rephrased as "a motion amount (for example, an amount of movement) of the lower part is set smaller, compared to the motion amount (for example, an amount of movement) of the upper part". The "motion amount of the lower part" may be a motion amount of the representative point of the lower part or the sum of the motion amounts of the respective points in the lower part. Similarly, the "motion amount of the upper part" may be a motion amount of the representative point of the upper part or the sum of the motion amounts of the respective points in the upper part.

The motion data is not limited to the movement motion data and the feint motion data. For example, short pass motion data for causing a game character 44 (46) to perform a short pass motion, shoot motion data for causing a game character 44 (46) to perform a shoot motion, and the like, are also stored in the game data storage unit 110.

Data other than the model data and the motion data is stored in the game data storage unit 110. For example, game situation data indicating a current situation of a game (a match) is stored in the game data storage unit 80. Game processing is executed for every predetermined period of time (for example, $\frac{1}{30}^{th}$ or $\frac{1}{60}^{th}$ of a second), as a result, the game situation data is updated.

For example, the game situation data includes data such as is shown below:
(1) state data of the ball 42 (position data, movement direction data, and the like);
(2) state data of the game characters 44 and 46;
(3) state data of the virtual camera 48 (position data, viewing direction data, and the like);
(4) score data; and
(5) elapsed period of time data.

Note that one example of the state data of the game characters 44 and 46 is similar to that in the first embodiment (see FIG. 11).

The user character control unit 112 controls the user character based on an operation by the user. That is, the user character control unit 112 causes the user character to perform various motions based on an operation by the user. As shown in FIG. 29, the user character control unit 112 includes a feint motion execution unit 114 and a movement motion execution unit 116.

When the user performs the first direction designating operation, the feint motion execution unit 114 reproduces the feint motion data, to thereby cause the user character to perform a feint motion in the direction designated through the first direction designating operation. In the case of the above described soccer game, a game character 44 that is the user's operation target corresponds to the "user character".

The "first direction designating operation" is an operation of designating a direction and is, for example, an operation of designating a direction using a first operation member. In the case of the above described soccer game, the right stick 24R corresponds to the "first operation member".

For example, in the case where the game controller 20 or the game device 10 has a detection unit for detecting a motion of the main body of the game controller 20, an operation of moving the game controller 20 to thereby designate a direction may correspond to the "first direction designating operation".

Further, for example, in the case where the game device 10 is a portable game device, a portable phone, or a portable information terminal incorporating a sensor (for example, an acceleration sensor, a gyrosensor, or the like) for detecting a motion of the main body of the portable game device, the portable phone, or the portable information terminal, an operation of moving the main body of the game device 10 (the main body of the portable game device, the portable phone, or the portable information terminal) to thereby designate a direction may correspond to the "first direction designating operation".

Further, for example, in the case where the game device 10 is a portable game device, a portable phone, or a portable information terminal having a touch screen, an operation of designating a direction using the touch screen may correspond to the "first direction designating operation". Specifically, an operation of designating a direction by sliding a finger or a touch pen on the touch screen or an operation of designating a direction by using an image (for example, a stick image or a button image) shown on the touch screen may correspond to the "first direction designating operation".

When the user performs the second direction designating operation, the movement motion execution unit 116 reproduces the movement motion data, to thereby cause the user character to perform a movement motion in the direction designated through the second direction designating operation.

Note here that the "second direction designating operation" refers to an operation of designating a direction but is different from the first direction designating operation. For example, the "second direction designating operation" refers to an operation of designating a direction using a second operation member that is different from the first operation member. In the case of the above described soccer game, the left stick 24L corresponds to the "second operation member".

For example, in the case where the game controller 20 or the game device 10 has a detection unit for detecting a motion of the main body of the game controller 20, an operation of moving the game controller 20 to thereby designate a direction may correspond to the "second direction designating operation".

Further, for example, in the case where the game device 10 is a portable game device, a portable phone, or a portable information terminal incorporating a sensor (for example, an acceleration sensor, a gyrosensor, or the like) for detecting a motion of the main body of the portable game device, the portable phone, or the portable information terminal, an operation of moving the main body of the game device 10 (the main body of the portable game device, the portable phone, or the portable information terminal) to thereby designate a direction may correspond to the "second direction designating operation".

For example, in the case where the game device 10 is a portable game device, a portable phone, or a portable information terminal having a touch screen, specifically, an operation of designating a direction by sliding a finger or a touch pen on the touch screen or an operation of designating a direction by using an image (for example, a stick image or a button image) shown on the touch screen may correspond to the "second direction designating operation".

The opponent character control unit 118 controls an opponent character that opposes the user character and is operated by a computer. In the case of the above described soccer game, a game character 46 belonging to the opponent team corresponds to the "opponent character".

For example, when the first direction designating operation for causing the user character to perform a feint motion (in other words, when the user character performs a feint motion) is executed, the opponent character control unit 118 causes the opponent character to perform a motion of reacting to the feint motion of the user character based on the direction designated through the first direction designating operation.

The "motion of reacting to the feint motion of the user character" will be described. The "motion of reacting to the feint motion of the user character" is a motion, for example, of falling for of the feint motion of the user character. In other words, the "motion of reacting to the feint motion of the user character" is a motion performed when being deceived by the feint motion of the user character. In other words, the "motion of reacting to the feint motion of the user character" is a motion of moving that is triggered by the feint motion of the user character. The "motion of reacting to the feint motion of the user character" will be hereinafter referred to as a "reacting motion".

Assume a case shown in FIG. 8. That is, assume a case in which the user character 44U holding the ball 42 is trying to dribble past the opponent character 46E. In this case, a motion of moving in the direction (the first direction 60) in which the user character 44U pretends to move corresponds to the "reacting motion". That is, a motion of moving in the second direction 62 shown in FIG. 8 corresponds to the "reacting motion".

Further, assume a case shown in FIG. 9. That is, assume a case in which the user character 44U is trying to block the opponent character 46E holding the ball 42 and dribbling. In this case, a motion of moving in the direction (the second direction 72) opposite from the direction (the first direction 70) in which the user character 44U pretends to move corresponds to the "reacting motion".

When there is an opponent character who should be caused to perform the above described reacting motion, the opponent character control unit 118 causes the opponent character to perform the reacting motion.

For example, in the case where the position and orientation of an opponent character have a predetermined relationship with the position of the user character, the opponent character control unit 118 determines that the opponent character is the "opponent character who should be caused to perform the reacting motion".

The "predetermined relationship" here refers to a relationship in which, for example, the opponent character is present near the user character, and the opponent character is watching the user character.

An example of processing for determining whether or not the opponent character and the user character hold the above described relationship will be described referring to FIG. 12. For example, the opponent character control unit 118 determines whether or not the two conditions A and B below are satisfied:

(A) the distance (d) between the user character 44U and the opponent character 46E is equal to or shorter than a reference distance; and (B) the angle (θe) between the forward direction 90 of the opponent character 46E and the direction 92 from the opponent character 46E to the user character 44U is equal to or smaller than a reference angle.

When these two conditions A and B are both satisfied, the opponent character control unit 118 determines that the opponent character 46E and the user character 44U hold the above described relationship, and then determines that the opponent character 46E is the "opponent character who should be caused to perform the reacting motion".

Note that the "predetermined relationship" may also refer to a relationship, for example, in which the opponent character is present near the user character, and the opponent character and the user character are watching each other.

An example of processing for determining whether or not the opponent character and the user character hold such a relationship will be described referring to FIG. 13. For example, the opponent character control unit 118 determines whether or not the three conditions A to C mentioned below are satisfied:

(A) the distance (d) between the user character 44U and the opponent character 46E is equal to or shorter than a reference distance;

(B) the angle (θe) between the forward direction 90 of the opponent character 46E and the direction 92 from the opponent character 46E to the user character 44U is equal to or smaller than a reference angle; and (C) the angle (θu) between the forward direction 94 of the user character 44U and the direction 96 from the user character 44U to the opponent character 46E is equal to or smaller than a reference angle.

In the case where these three conditions A to C are all satisfied, the opponent character control unit 118 determines that the opponent character 46E and the user character 44U hold the predetermined relationship, and then determines that the opponent character 46E is the "opponent character who should be caused to perform the reacting motion".

When there is the "opponent character who should be caused to perform the reacting motion", the opponent character control unit 118 may always cause the opponent character to perform the reacting motion, or determine whether or not to cause the opponent character to perform the reacting motion based on a determination criterion. In the latter aspect, only when it is determined to cause the opponent character to perform the reacting motion, the opponent character control unit 118 causes the opponent character to perform the reacting motion.

Below, three examples will be described as specific examples of the "determination criterion".

[1] Initially, a first example will be described. For example, the "determination criterion" refers to probability information indicating a probability of determining to cause the opponent character to perform the reacting motion. That is, the opponent character control unit 118 determines whether or not to cause the opponent character to perform the reacting motion, based on the probability information.

[2] A second example will be described. For example, whether or not a predetermined ability of the user character is high may be used as the "determination criterion". That is, when the predetermined ability of the user character is high, the opponent character control unit 118 may cause the opponent character to perform the reacting motion.

For example, the opponent character control unit 118 determines whether or not the value of the predetermined ability parameter of the user character is included in a reference range. The "reference range" is a range of a parameter value indicating a high predetermined ability of the user character. Then, the opponent character control unit 118 determines, based on the result of the above described determination, whether or not to cause the opponent character to perform the reacting motion.

Specifically, in the case where the value of the predetermined ability parameter of the user character is included in the reference range, the opponent character control unit 118 determines to cause the opponent character to perform the reacting motion. Meanwhile, when the value of the predetermined ability parameter of the user character is not included in the reference range, the opponent character control unit 118 determines not to cause the opponent character to perform the reacting motion.

Note that an ability parameter such as is described below, for example, may be used as the above described "predetermined ability parameter".

For example, when the user character 44U holding the ball 42 is trying to dribble past the opponent character 46E, as shown in FIG. 8, the dribble ability parameter may be used as the "predetermined ability parameter". In this manner, it may be determined to cause the opponent character 46E to perform the motion (the reacting motion) of reacting to the feint motion of the user character 44U when the user character 44U with high dribble ability is holding the ball 42 and performs the feint motion.

Further, for example, when the user character 44U is trying to block the opponent character 46E holding the ball 42 and dribbling, as shown in FIG. 9, the defense ability parameter may be used as the "predetermined ability parameter". In this manner, it may be determined to cause the opponent character 46E to perform the motion (the reacting motion) of reacting to the feint motion of the user character 44U when the user character 44U with high defense ability is trying to block the opponent character 46E dribbling and performs the feint motion.

[3] A third example will be described. For example, a condition for determining whether or not a predetermined ability of the opponent character is low may be used as the "reference criterion", and the opponent character control unit 118 may cause the opponent character to perform the reacting motion when the predetermined ability of the opponent character is low.

For example, the opponent character control unit 118 may determine whether or not the value of the predetermined ability parameter of the opponent character is included in a reference range. The "reference range" here is a range of a parameter value indicating a low predetermined ability of the opponent character. Then, the opponent character control unit 118 may determine, based on the result of determination, whether or not to cause the opponent character to perform the reacting motion.

Specifically, in the case where the value of the predetermined ability parameter of the opponent character is included in the reference range, the opponent character control unit 118 may determine to cause the opponent character to perform the reacting motion. Meanwhile, when the value of the predetermined ability parameter of the opponent character is not included in the reference range, the opponent character control unit 118 may determine not to cause the opponent character to perform the reacting motion.

Note that an ability parameter such as is described below, for example, may be used as the above described "predetermined ability parameter".

For example, when the user character 44U holding the ball 42 is trying to dribble past the opponent character 46E, as shown in FIG. 8, the defense ability parameter may be used as the "predetermined ability parameter". In this manner, it may be determined to cause the opponent character 46E to perform the motion (the reacting motion) of reacting to the feint motion of the user character 44U when the defense ability of the opponent character 46E is low.

Further, for example, when the user character 44U is trying to block the opponent character 46E holding the ball 42 and dribbling, as shown in FIG. 9, the dribble ability parameter may be used as the "predetermined ability parameter". In this manner, it may be determined to cause the opponent character 46E to perform the motion (the reacting motion) of reacting to the feint motion of the user character 44U when the dribble ability of the opponent character 46E is low.

Figure 30:
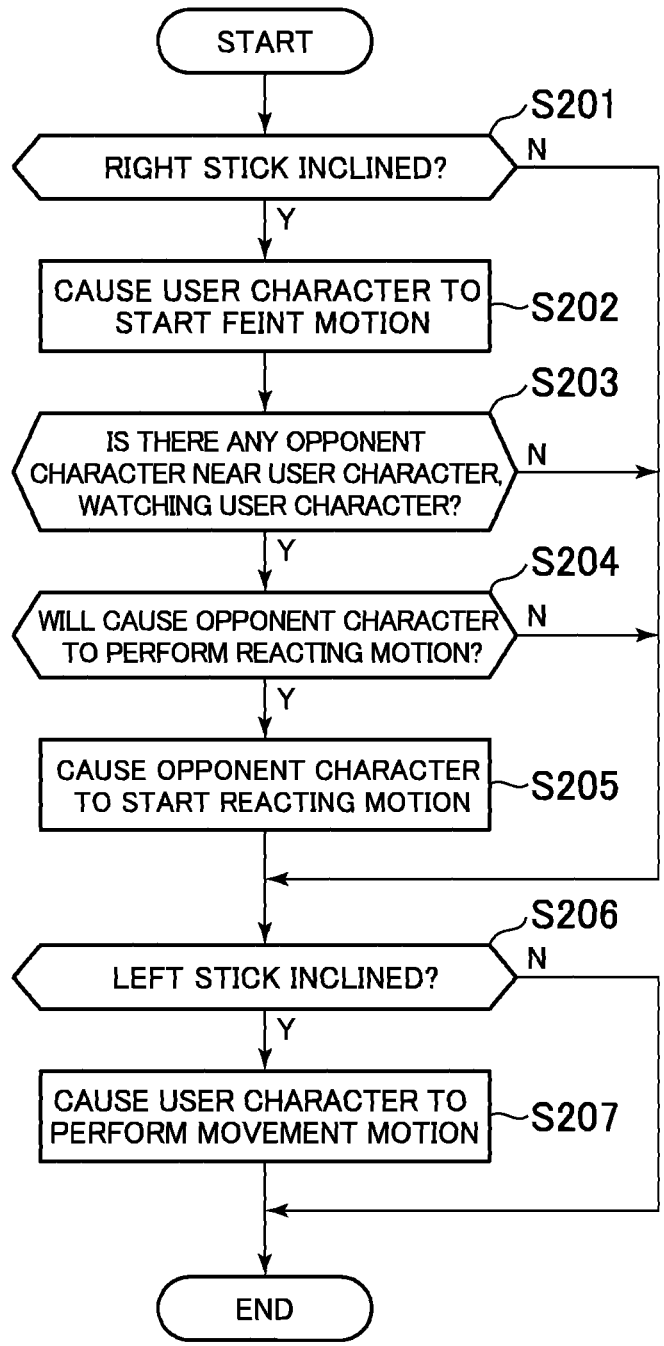
FIG. 30 is a flowchart of one example of processing executed in a game device according to the second embodiment.

In the following, processing that is executed in the game device 10 according to the second embodiment to implement the above described functional blocks will be described. FIG. 30 is a flowchart of one example of processing that is executed to cause the user character to perform a feint motion or a movement motion, among the processing executed in the game device 10 according to the second embodiment. The processing shown in FIG. 30 is repetitively executed in the game. The control unit 11 executes the processing shown in FIG. 30 according to a program, thereby functioning as the feint motion execution unit 114, the movement motion execution unit 116, and the opponent character control unit 118.

As shown in FIG. 30, initially, the control unit 11 determines, based on an operation signal from the operation unit 15, whether or not the right stick 24R is inclined (S201). When the right stick 24R is not inclined, the control unit 11 executes step S206 to be described later.

When the right stick 24R is inclined, the control unit 11 (the feint motion execution unit 114) starts reproduction of the feint motion data, to thereby cause the user character to start a feint motion in the direction corresponding to the inclination direction of the right stick 24R (S202).

Further, the control unit 11 determines whether or not there is an opponent character positioned near the user character and watching the user character (S203). That is, the control unit 11 determines whether or not there is an opponent character that satisfies both of the above described conditions A and B (or all of the above described conditions A to C).

When it is determined that there is no such opponent character as described above, the control unit 11 executes step S206 to be described later. Meanwhile, when it is determined that there is such opponent character as described above, the control unit 11 (the opponent character control unit 118) determines whether or not to cause the opponent character to perform the motion (the reacting motion) of reacting to the feint motion of the user character (S204). For example, the control unit 11 determines, based on predetermined probability information, whether or not to cause the opponent character to perform the reacting motion.

When it is determined not to cause the opponent character to perform the reacting motion, the control unit 11 executes step S206 to be described later. Meanwhile, when it is determined to cause the opponent character to perform the reacting motion, the control unit 11 (the opponent character control unit 118) causes the opponent character to start the reacting motion (S205).

That is, the control unit 11 starts reproduction of the motion data for the reacting motion, to thereby cause the opponent character to start the reacting motion. As described above, as the reacting motion is the "motion of moving that is triggered by the feint motion", the "motion data for the reacting motion" is movement motion data. Therefore, the reproduction period of the "motion data for the reacting motion" is longer, compared to that of the feint motion data.

Further, the control unit 11 determines whether or not the left stick 24L is inclined based on an operation signal from the operation unit 15 (S206). When the left stick 24L is not inclined, this processing is ended. When this processing is ended, this processing is executed again from the beginning.

Meanwhile, when the left stick 24L is inclined, the control unit 11 (the movement motion execution unit 116) reproduces the movement motion data to thereby cause the user character to perform a movement motion in the direction corresponding to the inclination direction of the left stick 24L (S207).

In the above, in the case where the user character is performing the feint motion, the control unit 11 holds start of the movement motion of the user character on standby until completion of the feint motion. Then, when the feint motion is completed, the control unit 11 causes the user character to start the movement motion. With the above, explanation of this processing is finished. Note that when this processing is ended, this processing is executed again from the beginning.

According to the game device 10 according to the second embodiment described above, it is possible to cause the user character to perform a feint motion in a desired direction.

As a result, it is possible to cause the user character 44U to perform a variety of feint motions when the user character 44U holding the ball 42 is trying to dribble past the opponent character 46E, as shown in FIG. 8, for example.

Moreover, not only when the user character 44U holding the ball 42 is dribbling past the opponent character 46E, but also when the user character 44U is trying to block the opponent character 46E holding the ball 42 and dribbling, as shown in FIG. 9, for example, it is possible to cause the user character 44U to perform a variety of feint motions.

Note that the second invention of this application is not limited to the embodiment described above.

[1] For example, although the opponent character control unit 118 determines whether or not to cause the opponent character to perform the reacting motion based on the determination criterion in the above described embodiment, the opponent character control unit 118 may change the "determination criterion". In the following, a specific example of an aspect in which the "determination criterion" is changed will be described. In the following, assume a case in which the "determination criterion" is probability information indicating a probability of determining to cause the opponent character to perform the reacting motion.

[1-1] Initially, a first example will be described. For example, the opponent character control unit 118 sets the above described probability information based on the ability parameter or the state parameter of the user character.

In this case, the game data storage unit 110 stores information for setting the above described probability information based on the ability parameter or the state parameter of the user character. One example of this information is similar to the example shown in FIG. 20. Note that information in an expression format may be stored, instead of the information in a table format such as is shown in FIG. 20.

The opponent character control unit 118 sets the above described probability information based on the ability parameter or the state parameter of the user character and the information shown in FIG. 20.

As shown in FIG. 8, for example, when the user character 44U holding the ball 42 is trying to dribble past the opponent character 46E, the opponent character control unit 118 sets the above described probability information based on the dribble ability parameter of the user character 44U and the information shown in FIG. 20. In this manner, it is possible to set a high probability of determining to cause the opponent character 46E to perform the motion (the reacting motion) of reacting to the feint motion of the user character 44U when the dribble ability of the user character 44U is high.

Further, as shown in FIG. 9, for example, when the user character 44U is trying to block the opponent character 46E holding the ball 42 and dribbling, the opponent character control unit 118 sets the above described probability information based on the defense ability parameter of the user character 44U and the information shown in FIG. 20. In this manner, it is possible to set a high probability of determining to cause the opponent character 46E to perform the motion (the reacting motion) of reacting to the feint motion of the user character 44U when the defense ability of the user character 44U is high.

[1-2] A second example will be described. For example, the opponent character control unit 118 sets the above described probability information based on the ability parameter or the state parameter of the opponent character.

In this case, the game data storage unit 110 stores information for setting the above described probability information based on the ability parameter or the state parameter of the opponent character. One example of this information is similar to the example shown in FIG. 21. Note that information in an expression format may be stored, instead of the information in a table format such as is shown in FIG. 21.

The opponent character control unit 118 sets the above described probability information, based on the ability parameter or the state parameter of the opponent character and the information shown in FIG. 21.

As shown in FIG. 8, for example, when the user character 44U holding the ball 42 is trying to dribble past the opponent character 46E, the opponent character control unit 118 sets the above described probability information based on the defense ability parameter of the opponent character 46E and the information shown in FIG. 21. In this manner, it is possible to set a high probability of determining to cause the opponent character 46E to perform the motion (the reacting motion) of reacting to the feint motion of the user character 44U when the defense ability of the opponent character 46E is low.

Further, as shown in FIG. 9, for example, when the user character 44U is trying to block the opponent character 46E holding the ball 42 and dribbling, the opponent character control unit 118 sets the above described probability information based on the dribble ability parameter of the opponent character 46E and the information shown in FIG. 21. In this manner, it is possible to set a high probability of determining to cause the opponent character 46E to perform the motion (the reacting motion) of reacting to the feint motion of the user character 44U when the dribble ability of the opponent character 46E is low.

[1-3] A third example will be described. For example, when the first direction designating operation for causing the user character to perform a feint motion is performed, the opponent character control unit 118 sets the above described probability information based on the current situation of the game.

[1-3-1] For example, the opponent character control unit 118 sets the probability information based on the movement speed of the user character.

In this case, the game data storage unit 110 stores information for setting the above described probability information based on the movement speed of the user character. One example of this information is similar to the example shown in FIG. 22. Note that information in an expression format may be stored, instead of the information in a table format such as is shown in FIG. 22.

The opponent character control unit 118 sets the above described probability information, based on the movement speed of the user character when the first direction designating operation for causing the user character to perform a feint motion is performed (or when the user character performs a feint motion) and the information shown in FIG. 22. In this manner, it is possible to set a high probability of determining to cause the opponent character to perform the motion (the reacting motion) of reacting to the feint motion of the user character when the movement speed of the user character is fast.

[1-3-2] For example, the opponent character control unit 118 sets the above described probability information based on the movement speed of the opponent character.

In this case, the data storage unit 110 stores information for setting the above described probability information based on the movement speed of the opponent character. One example of this information is similar to the example shown in FIG. 23. Note that information in an expression format may be stored, instead of the information in a table format such as is shown in FIG. 23.

The opponent character control unit 118 sets the above described probability information, based on the movement speed of the opponent character when the first direction designating operation for causing the user character to perform a feint motion is performed (or when the user character performs a feint motion) and the information shown in FIG. 23. In this manner, it is possible to set a high probability of determining to cause the opponent character to perform the motion (the reacting motion) of reacting to the feint motion of the user character when the movement speed of the opponent character is slow.

[1-3-3] For example, the opponent character control unit 118 may set the above described probability information based on both of the movement speed of the user character and that of the opponent character.

In this case, the game data storage unit 110 stores information for setting the probability information based on both of the movement speed of the user character and that of the opponent character. For example, information, such as a combination of the information shown in FIG. 22 and that in FIG. 23, is stored in the game data storage unit 110. The opponent character control unit 118 sets the above described probability information based on both of the movement speed of the user character and that of the opponent character and the information.

Note that, alternatively, the opponent character control unit 118 may set the above described probability information based on the relative movement speed of the user character relative to that of the opponent character.

In this case, the game data storage unit 110 stores information for setting the above described probability information based on the relative movement speed of the user character. For example, information similar to that shown in FIG. 22 is stored in the game data storage unit 110. The opponent character control unit 118 sets the above described probability information based on the relative movement speed of the user character and the information.

[1-3-4] For example, the opponent character control unit 118 sets the above described probability information based on the distance between the user character and the ball 42 (a moving object).

In this case, the game data storage unit 110 stores information for setting the above described probability information based on the above described distance. One example of this information is similar to the example shown in FIG. 24. Note that information in an expression format may be stored, instead of the information in a table format such as is shown in FIG. 24.

The opponent character control unit 118 sets the above described probability information based on the distance from the user character to the ball 42 when the first direction designating operation for causing the user character to perform a feint motion is performed (or when the user character performs a feint motion), and the information shown in FIG. 24. In this manner, it is possible to set a high possibility of determining to cause the opponent character to perform the motion (the reacting motion) of reacting to the feint motion of the user character when the distance from the user character to the ball 42 is short.

[1-3-5] For example, the opponent character control unit 118 sets the above described probability information based on the distance between the opponent character and the ball 42 (a moving object).

In this case, the game data storage unit 110 stores information for setting the above described probability information based on the above described distance. One example of this information is similar to the example shown in FIG. 25. Note that information in an expression format may be stored, instead of the information in a table format such as is shown in FIG. 25.

The opponent character control unit 118 sets the above described probability information, based on the distance from the opponent character to the ball 42 when the first direction designating operation for causing the user character to perform a feint motion is performed (or when the user character performs a feint motion), and the information shown in FIG. 25. In this manner, it is possible to set a high probability of determining to cause the opponent character to perform the motion (the reacting motion) of reacting to the feint motion of the user character when the distance from the opponent character to the ball 42 is long.

[2] For example, in causing the user character to perform the feint motion, the feint motion execution unit 114 may change the reproduction speed of the feint motion data.

[2-1] For example, the feint motion execution unit 114 sets the above described reproduction speed based on the ability parameter or the state parameter of the user character.

In this case, the game data storage unit 110 stores information for setting the above described reproduction speed based on the ability parameter or the state parameter of the user character. One example of this information is similar to the example shown in FIG. 26. Note that information in an expression format may be stored, instead of the information in a table format such as is shown in FIG. 26.

The feint motion execution unit 114 sets the above described reproduction speed based on the ability parameter or the state parameter of the user character and the information shown in FIG. 26.

As shown in FIG. 8, for example, when the user character 44U holding the ball 42 is trying to dribble past the opponent character 46E, the feint motion execution unit 114 sets the above described reproduction speed based on the dribble ability parameter of the user character 44U and the information shown in FIG. 26.

In this manner, it is possible to set a fast reproduction speed of the feint motion data when the dribble ability of the user character 44U is high. In this case, as the reproduction speed of the feint motion data is faster, the feint motion (the feint motion in the first direction 60) is completed earlier, and therefore, the user character 44U can start the next motion (the movement motion in the third direction 64) earlier. As a result, the user character 44U can more readily dribble past the opponent character 46E.

Further, as shown in FIG. 9, for example, when the user character 44U is trying to block the opponent character 46E holding the ball 42 and dribbling, the feint motion execution unit 114 sets the above described reproduction speed based on the defense ability parameter of the user character 44U and the information shown in FIG. 26.

In this manner, it is possible to set a fast reproduction speed of the feint motion data when the defense ability of the user character 44U is high. In this case, as the reproduction speed of the feint motion data is faster, the feint motion (the feint motion in the first direction 70) is completed earlier, and therefore, the user character 44U can start the next motion (the movement motion in the third direction 74) earlier. As a result, the user character 44U can more readily block the opponent character 46E dribbling.

[2-2] Further, for example, the feint motion execution unit 114 sets the above described reproduction speed based on the ability parameter or the state parameter of the opponent character.

In this case, the game data storage unit 110 stores information for setting the above described reproduction speed based on the ability parameter or the state parameter of the opponent character. One example of this information is similar to the example shown in FIG. 27. Note that information in an expression format may be stored, instead of the information in a table format such as is shown in FIG. 27.

The feint motion execution unit 114 sets the above described reproduction speed based on the ability parameter or the state parameter of the opponent character and the information shown in FIG. 27.

As shown in FIG. 8, for example, when the user character 44U holding the ball 42 is trying to dribble past the opponent character 46E, the feint motion execution unit 114 sets the above described reproduction speed based on the defense ability parameter of the opponent character 46E and the information shown in FIG. 27.

In this manner, it is possible to set a fast reproduction speed of the feint motion data when the defense ability of the opponent character 46E is low. In this case, as the reproduction speed of the feint motion data is faster, the feint motion (the feint motion in the first direction 60) is completed earlier, and therefore, the user character 44U can start the next motion (the movement motion in the third direction 64) earlier. As a result, the user character 44U can more readily dribble past the opponent character 46E.

Further, as shown in FIG. 9, for example, when the user character 44U is trying to block the opponent character 46E holding the ball 42 and dribbling, the feint motion execution unit 114 sets the above described reproduction speed based on the dribble ability parameter of the opponent character 46E and the information shown in FIG. 27.

In this manner, it is possible to set a fast reproduction speed of the feint motion data when the dribble ability of the opponent character 46E is low. In this case, as the reproduction speed of the feint motion data is faster, the feint motion (the feint motion in the first direction 70) is completed earlier, and therefore, the user character 44U can start the next motion (the movement motion in the third direction 74) earlier. As a result, the user character 44U can more readily block the opponent character 46E dribbling.

[3] For example, the second invention of this application can be applied to a game system. For example, the second invention of this application can be applied to a game system 100 such as is shown in FIG. 28.

In this case, processing at the respective steps shown in FIG. 30 is executed in the game server 102, and the respective functional blocks shown in FIG. 29 are implemented by the control unit of the game server 102 (a game control device).

Alternatively, implication of the functional blocks shown in FIG. 29 may be shared by the game server 102 and the game device 10. That is, some of the functional blocks shown in FIG. 29 may be implemented in the game server 102, while the other in the game device 10.

[4] Although the game space 30 is a virtual 3D space in the above described embodiment, the game space may be a virtual 2D space. That is, the position or the like of a character may be defined by two coordinates.

[5] In the above, a case is described in which the second invention of this application is applied to a soccer game. However, the second invention of this application can be applied to a game other than a soccer game. For example, the second invention of this application can be applied to a sport game that emulates a sport that is played using a moving object. Further, for example, the second invention of this application can be applied to a game other than a sport game. The second invention of this application can be applied to a game in which a user character acts according to an operation by a user.

Summary of Second Invention of Application

According to the above description, the second invention of this application can be understood as follows, for example. Note that in the description below, although the reference numerals shown in the drawings are included with parenthesis to help understanding of the second invention of this application, the second invention of this application is not thereby limited to the aspect shown.

A game control device according to the second invention of this application is a game control device (10 or 102) for executing a game in which a user character acts according to an operation by a user, and includes: means (112) for obtaining movement motion data stored in means (110) for storing the movement motion data for causing the user character to perform a movement motion; means (112) for obtaining feint motion data stored in means (110) for storing the feint motion data that is motion data for causing the user character to perform a feint motion, a reproduction period of the feint motion data being shorter than that of the movement motion data; feint motion execution means (114) for, in a case where the user performs a first direction designating operation, causing the user character to perform a feint motion in the direction corresponding to the first direction designating operation by reproducing the feint motion data; and movement motion execution means (116) for, in a case where the user performs a second direction designating operation, causing the user character to perform a movement motion in the direction corresponding to the second direction designating operation by reproducing the movement motion data.

A game system according to the second invention of this application is a game system (100) for executing a game in which a user character acts according to an operation by a user, and includes: means (112) for obtaining movement motion data stored in means (110) for storing the movement motion data for causing the user character to perform a movement motion; means (112) for obtaining feint motion data stored in means (110) for storing the feint motion data that is motion data for causing the user character to perform a feint motion, a reproduction period of the feint motion data being shorter than that of the movement motion data; feint motion execution means (114) for, in a case where the user performs a first direction designating operation, causing the user character to perform a feint motion in the direction corresponding to the first direction designating operation by reproducing the feint motion data; and movement motion execution means (116) for, in a case where the user performs a second direction designating operation, causing the user character to perform a movement motion in the direction corresponding to the second direction designating operation by reproducing the movement motion data.

A game control method according to the second invention of this application is a game control method of a game in which a user character acts according to an operation by a user, and the game control method includes: obtaining movement motion data stored in a storage (110) that stores the movement motion data for causing the user character to perform a movement motion; obtaining feint motion data stored in a storage (110) that stores the feint motion data that is motion data for causing the user character to perform a feint motion, a reproduction period of the feint motion data being shorter than that of the movement motion data; causing, in a case where the user performs a first direction designating operation, the user character to perform a feint motion in the direction corresponding to the first direction designating operation by reproducing the feint motion data; and causing, in a case where the user performs a second direction designating operation, the user character to perform a movement motion in the direction corresponding to the second direction designating operation by reproducing the movement motion data.

A program according to a second invention of this application is a program for causing a computer to: obtain movement motion data stored in a storage (110) that stores the movement motion data for causing the user character to perform a movement motion; obtain feint motion data stored in a storage (110) that stores the feint motion data that is motion data for causing the user character to perform a feint motion, a reproduction period of the feint motion data being shorter than that of the movement motion data; cause, in a case where the user performs a first direction designating operation, the user character to perform a feint motion in the direction corresponding to the first direction designating operation by reproducing the feint motion data; and cause, in a case where the user performs a second direction designating operation, the user character to perform a movement motion in the direction corresponding to the second direction designating operation by reproducing the movement motion data.

An information storage medium according to the second invention of this application is a non-transitory computer-readable information storage medium storing the above described program.

In one aspect of the second invention of this application, the feint motion data may include a portion identical or substantially identical to a portion of a predetermined length from the top of the movement motion data.

In one aspect of the second invention of this application, the feint motion data may be data in which a motion range of a lower part of the user character is set smaller than that of an upper part of the user character.

In one aspect of the second invention of this application, the game control device may further include means for obtaining a parameter stored in means (110) for storing the parameter relating to an ability or a state of the user character, and the feint motion execution means (114) may include means for setting a reproduction speed of the feint motion data based on the parameter of the user character.

In one aspect of the second invention of this application, the game control device may further include means for obtaining a parameter stored in means (110) for storing the parameter relating to an ability or a state of an opponent character opposing the user character, and the feint motion execution means (114) may include means for setting a reproduction speed of the feint motion data based on the parameter of the opponent character.

In one aspect of the second invention of this application, the game control device may further include opponent character control means (118) for controlling an opponent character that is a game character opposing the user character and controlled by a computer, and in the case where the first direction designating operation is performed, the opponent character control means (118) may cause the opponent character to perform a motion of reacting to the feint motion of the user character based on the direction corresponding to the first direction designating operation.

In one aspect of the second invention of this application, the opponent character control means (118) may include means for determining whether or not to cause the opponent character to perform the motion of reacting to the feint motion based on predetermined determination criterion, means for obtaining a parameter stored in means for storing the parameter relating to an ability or a state of the user character, and means for setting the determination criterion based on the parameter of the user character.

In one aspect of the second invention of this application, the opponent character control means (118) may include means for determining whether or not to cause the opponent character to perform the motion of reacting to the feint motion based on predetermined determination criterion, means for obtaining a parameter stored in means for storing the parameter relating to an ability or a state of the opponent character, and means for setting the determination criterion based on the parameter of the opponent character.

In one aspect of the second invention of this application, the opponent character control means (118) may include means for determining whether or not to cause the opponent character to perform the motion of reacting to the feint motion based on predetermined determination criterion, and means for setting the determination criterion based on the current situation of the game, in the case where the first direction designating operation is performed.

In one aspect of the second invention of this application, the opponent character control means (118) may include means for setting the determination criterion based on the movement speed of at least one of the user character and the opponent character, in the case where the first direction designating operation is performed.

In one aspect of the second invention of this application, the game may be a game of a sport that is played using a moving object, and the opponent character control means (118) may include means for setting the determination criterion based on the distance between the user character and the moving object, in the case where the first direction designating operation is performed.

In one aspect of the second invention of this application, the game may be a game of a sport that is played using a moving object, and the opponent character control means (118) may include means for setting the determination criterion based on the distance between the opponent character and the moving object, in the case where the first direction designating operation is performed.

In one aspect of the second invention of this application, the first direction designating operation may be a direction designating operation performed using a first operation member. The second direction designating operation may be a direction designating operation performed using a second operation member.

While there have been described what are at present considered to be certain embodiments of the invention, it will be understood that various modifications may be made thereto, and it is intended that the appended claims coverall such modifications as fall within the true spirit and scope of the invention.

What is claimed is:

1. A game control device for executing a game in which a user character acts according to an operation by a user, the game control device comprising:
at least one processor; and
at least one memory device that stores a plurality of instructions, which when executed by the at least one processor, cause the at least one processor to:
when a direction designating operation is performed by the user, obtain a relative direction of a direction designated through the direction designating operation relative to a forward direction of the user character;
select a motion data from a plurality of kinds of motion data, where the plurality of kinds of motion data are stored in a storage such that each of the plurality of kinds of motion data are each correlated to the one of a plurality of types of relative directions, and the selection of the motion data is based on the correlation to a type of the obtained relative direction; and
cause the user character to perform a motion in accordance with the selected motion data,
wherein the game further comprises a moving object, and
the plurality of instructions cause the at least one processor to select a second motion data from the plurality of kinds of motion data correlated to a type of the obtained relative direction, based on a position of the moving object.

2. The game control device according to claim 1, wherein the plurality of instructions cause the at least one processor to further:
obtain, from the storage, a parameter of the user character relating to at least one of an ability and a state of the user character, wherein
the processor further selects any of the motion data correlated to the type to which the obtained relative direction belongs, based on the parameter of the user character.

3. The game control device according to claim 1, wherein the plurality of instructions cause the at least one processor to further:
obtain, from the storage, a parameter of an opponent character relating to at least one of an ability and a state of the opponent character, the opponent character being a game character opposing the user character, wherein select any of the motion data correlated to the type to which the obtained relative direction belongs, based on the parameter of the opponent character.

4. The game control device according to claim 1, wherein the plurality of instructions cause the at least one processor to further:

select any of the motion data correlated to the type to which the obtained relative direction belongs, based on a current situation of the game.

5. The game control device according to claim 4, wherein the plurality of instructions cause the at least one processor to further:

select any of the motion data correlated to the type to which the obtained relative direction belongs, based on a positional relationship between the user character and an opponent character that is a game character opposing the user character.

6. The game control device according to claim 1, wherein the plurality of instructions cause the at least one processor to further:

select any of the motion data correlated to the type to which the obtained relative direction belongs, based on a positional relationship between the moving object and the user character.

7. The game control device according to claim 1, wherein the plurality of instructions cause the at least one processor to further:

select any of the motion data correlated to the type to which the obtained relative direction belongs, based on a positional relationship between the moving object and an opponent character that is a game character opposing the user character.

8. The game control device according to claim 1, wherein the plurality of instructions cause the at least one processor to further:

obtain, from the storage, a parameter of the user character relating to at least one of an ability and a state of the user character, wherein the processor further causes the user character to perform the motion by reproducing the selected motion data, and sets a reproduction speed of the selected motion data, based on the parameter of the user character.

9. The game control device according to claim 1, wherein the plurality of instructions cause the at least one processor to further:

obtain, from the storage, a parameter of an opponent character relating to at least one of an ability and a state of the opponent character, the opponent character being a game character opposing the user character, wherein cause the user character to perform the motion by reproducing the selected motion data, and set a reproduction speed of the selected motion data, based on the parameter of the opponent character.

10. The game control device according to claim 1, wherein the plurality of instructions cause the at least one processor to further:

determine, in a case where the user character performs the motion, whether or not to cause an opponent character to perform a reacting motion that is a motion of reacting to the motion of the user character, based on predetermined information, the opponent character being a game character opposing the user character, and cause the opponent character to perform the reacting motion, according to a result of determination by the determination means.

11. The game control device according to claim 10, wherein the plurality of instructions cause the at least one processor to further perform at least one of:

obtain, from the storage, a parameter of the user character relating to at least one of an ability and a state of the user character, and obtain, from the storage, a parameter of the opponent character relating to at least one of an ability and a state of the opponent character, wherein the processor further determines whether or not to cause the opponent character to perform the reacting motion, based on at least one of the parameter of the user character and the parameter of the opponent character.

12. The game control device according to claim 11, wherein the plurality of instructions cause the at least one processor to further:

determine whether or not to cause the opponent character to perform the reacting motion, based on a result of comparison between the parameter of the user character and the parameter of the opponent character.

13. The game control device according to claim 10, wherein the plurality of instructions cause the at least one processor to further:

determine whether or not to cause the opponent character to perform the reacting motion, based on a current situation of the game.

14. The game control device according to claim 13, wherein the plurality of instructions cause the at least one processor to further:

determine whether or not to cause the opponent character to perform the reacting motion, based on a movement speed of at least one of the user character and the opponent character.

15. The game control device according to claim 13, wherein the plurality of instructions cause the at least one processor to further:

determine whether or not to cause the opponent character to perform the reacting motion, based on a position of at least one of the user character and the opponent character.

16. The game control device according to claim 1, wherein the plurality of instructions cause the at least one processor to further:

when a second direction designating operation is performed, cause the user character to perform a movement motion of moving in a direction designated through the second direction designating operation, wherein when the user performs a first direction designating operation, obtain a relative direction of a direction designated through the first direction designating operation relative to the forward direction of the user character, select any of motion data correlated to a type to which the obtained relative direction belongs from among stored motion data and a plurality of kinds of motion data relating to a motion different from the movement motion so as to be correlated to each other; and cause the user character to perform a motion in accordance with the selected motion data.

17. The game control device according to claim 16, wherein the plurality of instructions cause the at least one processor to further:

select any of feint motion data correlated to the type to which the obtained relative direction belongs from among stored feint motion data, and cause the user character to perform a feint motion in accordance with the selected feint motion data.

18. A game control method for executing a game in which a user character acts according to an operation by a user, the game control method comprising:

obtaining, in a case where a direction designating operation is performed by the user, a relative direction of a direction designated through the direction designating operation relative to a forward direction of the user character;

selecting a motion data from a plurality of kinds of motion data, where the plurality of kinds of motion data are stored in a storage such that each of the plurality of kinds of motion data are each correlated to the one of a plurality of types of relative directions, and the selection of the motion data is based on the correlation to a type of the obtained relative direction; and causing the user character to perform a motion in accordance with the selected motion data, wherein the game further comprises a moving object, and selecting a second motion data from the plurality of kinds of motion data correlated to a type of the obtained relative direction, based on a position of the moving object.

19. A non-transitory computer-readable storage medium for storing a program for causing a computer to function as a game device for executing a game in which a user character acts according to an operation by a user, the program for causing the computer to:

obtain, in a case where a direction designating operation is performed by the user, a relative direction of a direction designated through the direction designating operation relative to a forward direction of the user character;

select a motion data from a plurality of kinds of motion data, where the plurality of kinds of motion data are stored such that each of the plurality of kinds of motion data are each correlated to the one of a plurality of types of relative directions, and the selection of the motion data is based on the correlation to a type of the obtained relative direction; and cause the user character to perform a motion in accordance with the selected motion data, wherein the game further comprises a moving object, and select a second motion data from the plurality of kinds of motion data correlated to a type of the obtained relative direction, based on a position of the moving object.

20. A game control device for executing a game in which a user character acts according to an operation by a user, the game control device comprising:

a direction obtaining unit that obtains, in a case where a direction designating operation is performed by the user, a relative direction of a direction designated through the direction designating operation relative to a forward direction of the user character;

a motion data selection unit that selects a motion data from a plurality of kinds of motion data, where the plurality of kinds of motion data are stored in a storage such that each of the plurality of kinds of motion data are each correlated to the one of a plurality of types of relative directions, and the selection of the motion data is based on the correlation to a type of the obtained relative direction; and a user character control unit that causes the user character to perform a motion in accordance with the motion data selected by the motion data selection unit, wherein the game further comprises a moving object, and the motion data selection unit that selects a second motion data from the plurality of kinds of motion data correlated to a type of the obtained relative direction, based on a position of the moving object.

* * * * *